(12) United States Patent
Cottet et al.

(10) Patent No.: US 12,030,615 B2
(45) Date of Patent: Jul. 9, 2024

(54) SYSTEM FOR CONTROLLING THE PITCH OF A PROPELLER VANE FOR AN AIRCRAFT TURBINE ENGINE

(71) Applicant: SAFRAN AIRCRAFT ENGINES, Paris (FR)

(72) Inventors: Clément Cottet, Moissy-Cramayel (FR); Vivien Mickaël Courtier, Moissy-Cramayel (FR); Vincent Joudon, Moissy-Cramayel (FR); Régis Eugène Henri Servant, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 18/006,089

(22) PCT Filed: Jul. 15, 2021

(86) PCT No.: PCT/FR2021/051311
§ 371 (c)(1),
(2) Date: Jan. 19, 2023

(87) PCT Pub. No.: WO2022/018354
PCT Pub. Date: Jan. 27, 2022

(65) Prior Publication Data
US 2023/0339600 A1  Oct. 26, 2023

(30) Foreign Application Priority Data

| Jul. 24, 2020 | (FR) | 2007809 |
| Jul. 24, 2020 | (FR) | 2007812 |
| Mar. 15, 2021 | (FR) | 2102547 |

(51) Int. Cl.
*B64C 11/06* (2006.01)
*F01D 5/30* (2006.01)
*F01D 7/00* (2006.01)

(52) U.S. Cl.
CPC ................ *B64C 11/06* (2013.01); *F01D 5/30* (2013.01); *F01D 7/00* (2013.01)

(58) Field of Classification Search
CPC ......... B64C 11/02; B64C 11/04; B64C 11/06; F01D 5/30; F01D 7/00
See application file for complete search history.

(56) References Cited

U.S. PATENT DOCUMENTS

| 1,573,000 A | | 2/1926 | Heath |
| 2,017,505 A | | 10/1935 | Meon |
| 2,648,391 A | | 8/1953 | Cushman et al. |
| 2,704,129 A | * | 3/1955 | Cushman ................ B64C 11/06 |
| | | | 416/205 |

(Continued)

FOREIGN PATENT DOCUMENTS

| CA | 2778569 A1 * 12/2012 ............. B64C 11/06 |
| CH | 194634 A 12/1937 |

(Continued)

OTHER PUBLICATIONS

Office Furnished WO 2011009702 A1 (Year: 2011).*

(Continued)

*Primary Examiner* — Juan G Flores
*Assistant Examiner* — Ryan C Clark
(74) *Attorney, Agent, or Firm* — Christensen O'Connor Johnson Kindness PLLC

(57) ABSTRACT

A system for controlling the pitch of a propeller blade for an aircraft turbine engine is provided. The system generally includes a cup having an annular wall extending about a pitch setting axis of the blade, the annular wall having a lower axial end enclosed by a bottom wall, and an upper axial end that is open and configured so as to enable a root of the blade to be mounted in the cup; and a locking ring that extends around the pitch setting axis and is configured to be mounted around the root, the locking ring being a double dog ring that comprises two annular rows of outer dogs constituting active and safety dogs, respectively.

14 Claims, 23 Drawing Sheets

(56) References Cited

U.S. PATENT DOCUMENTS

| | | | | |
|---|---|---|---|---|
| 3,061,341 | A | * | 10/1962 | Grzych ................... B64C 11/04 |
| | | | | 244/65 |
| 4,762,466 | A | * | 8/1988 | Bouiller ................... F01D 5/02 |
| | | | | 416/205 |
| 5,118,256 | A | | 6/1992 | Violette et al. |
| 8,801,383 | B2 | * | 8/2014 | Soule ...................... F16C 19/06 |
| | | | | 416/204 R |
| 9,328,737 | B2 | * | 5/2016 | Bouru ................... F04D 29/056 |
| 2008/0279689 | A1 | | 11/2008 | Sebald |
| 2010/0239421 | A1 | * | 9/2010 | Boston ................... B64C 11/48 |
| | | | | 416/136 |
| 2013/0094943 | A1 | | 4/2013 | Bouru et al. |
| 2015/0330233 | A1 | | 11/2015 | Petellaz et al. |
| 2016/0290228 | A1 | | 10/2016 | van der Merwe et al. |
| 2017/0190433 | A1 | * | 7/2017 | Monton ................ B64C 11/306 |

FOREIGN PATENT DOCUMENTS

| | | | |
|---|---|---|---|
| DE | 43 15 080 A1 | 11/1994 | |
| EP | 2674357 A2 | 12/2013 | |
| FR | 2993920 A1 * | 1/2014 | ............. B64C 11/06 |
| FR | 3 017 163 A1 | 8/2015 | |
| FR | 3017163 A1 * | 8/2015 | ............. B64C 11/06 |
| FR | 3 080 322 A1 | 10/2019 | |
| GB | 240291 A | 10/1925 | |
| WO | WO-2011009702 A1 * | 1/2011 | ............. B64C 11/04 |
| WO | WO-2015121579 A1 * | 8/2015 | ............. B64C 11/06 |

OTHER PUBLICATIONS

Office Furnished CA 2778569 A1 (Year: 2012).*
Office Furnished FR 2993920 A1 (Year: 2014).*
Office Furnished FR 3017163 A1 (Year: 2015).*
Office Furnished WO 2015121579 A1 (Year: 2015).*
International Search Report mailed Nov. 5, 2021, issued in corresponding International Application No. PCT/FR2021/051311, filed Jul. 15, 2021, 6 pages.
Written Opinion mailed Nov. 5, 2021, issued in corresponding International Application No. PCT/FR2021/051311, filed Jul. 15, 2021, 6 pages.

* cited by examiner

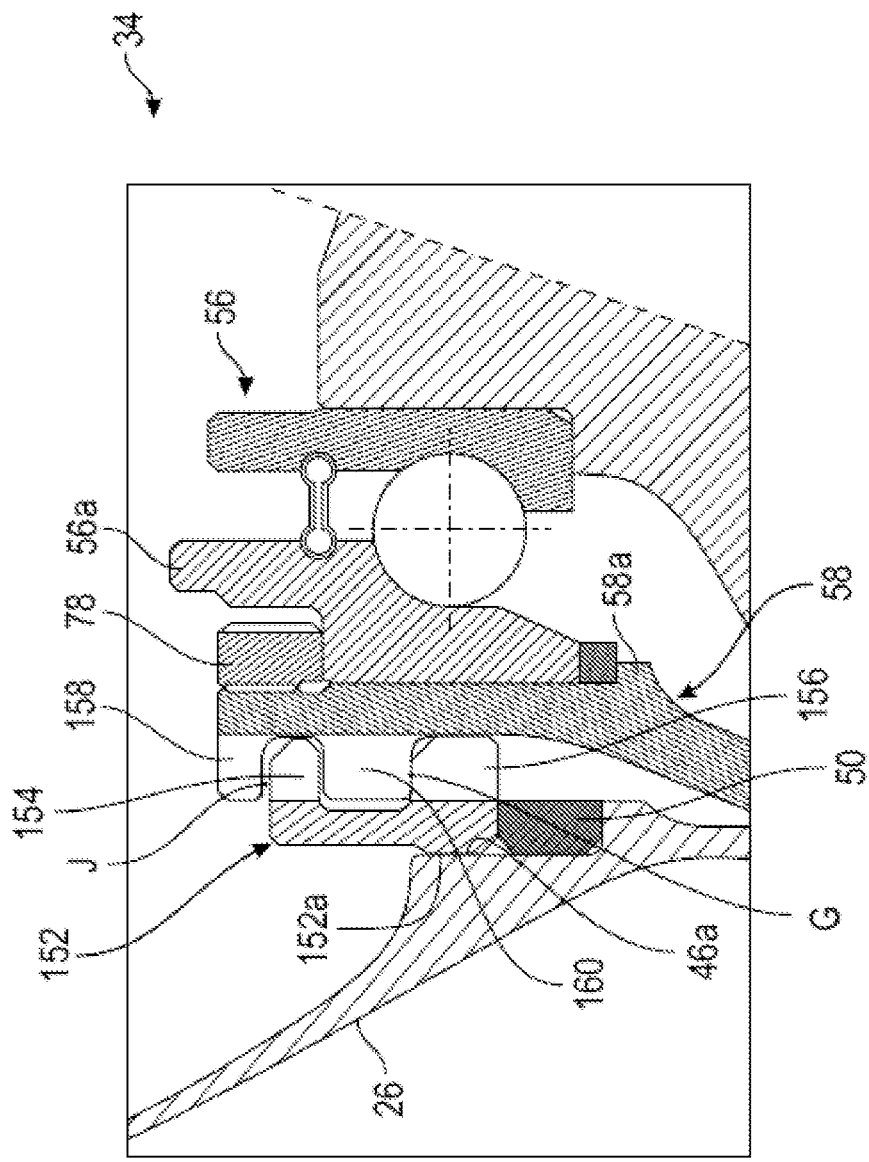

SYSTEM FOR CONTROLLING THE PITCH OF A PROPELLER VANE FOR AN AIRCRAFT TURBINE ENGINE

CROSS-REFERENCE TO RELATED APPLICATIONS

This application is a National Stage of International Application No. PCT/FR2021/051311, filed Jul. 15, 2021, which claims priority to French Patent Application No. 2102547, filed Mar. 15, 2021, French Patent Application No. 2007809, filed Jul. 24, 2020, and French Patent Application No. 2007812, filed Jul. 24, 2020, the entire disclosures of which are hereby incorporated by reference in their entirety for all purposes.

TECHNICAL FIELD OF THE INVENTION

The present invention relates to the field of aircraft turbine engines and in particular to the propulsion propellers of these turbine engines which comprise variable pitch vanes.

TECHNICAL BACKGROUND

The prior art comprises in particular the documents FR-A1-3 017 163 and FR-A1-3 080 322.

An aircraft turbine engine propeller can be ducted, as in the case of a fan for example, or un-ducted, as in the case of an open-rotor architecture for example.

A propeller comprises vanes which may be pitch variable. The turbine engine then comprises a mechanism allowing for changing the pitch angle of the vanes in order to adapt the thrust generated by the propeller to different phases of flight.

The design of a propeller vane involves several disciplines with generally conflicting objectives. It must allow optimal aerodynamic performance (i.e. provide a thrust while maximising the efficiency), guarantee a mechanical strength of the vane (i.e. withstand the mechanical constraints resulting from static and dynamic loadings) while limiting the mass and the acoustic signature. In particular, the improvement in the aerodynamic performance of the propeller tends towards an increase of the BPR (By Pass Ratio), which translates into an increase in its external diameter and therefore in the span of the vanes. However, the increase in the BPR goes hand in hand with a reduction in the FPF (Fan Pressure Ratio). Therefore, a pitch change system (variable pitch vane) is usually required to make the propeller operable throughout the flight domain.

There are several technologies for attaching a variable pitch propeller vane and several technologies for controlling the angular pitch of such a propeller vane. However, these technologies are relatively complex and expensive. Furthermore, in the event of a problem, and in particular breakage, they do not guarantee that the vanes are retained radially outwards in relation to the axis of rotation of the propeller, particularly when this propeller is not ducted.

In the event of failure of the retention means for a vane of the propeller, it is particularly important to ensure that this vane is retained in order to prevent it from being projected outwards and impacting the fuselage of the aircraft equipped with the turbine engine. This safety function, referred to as "failsafe", is not always present in the control systems of the current technologies. The control systems that comprise this function typically comprise elements that are themselves susceptible to detachment and impact on the fuselage of the aircraft. The greater the size and density of these elements, the greater the risk of damage to the fuselage and the greater the need for specific shielding, which impacts on the mass of the aircraft and therefore its performance.

There is therefore a need for a control system technology that integrates a simple and effective safety function.

SUMMARY OF THE INVENTION

The invention relates to a system for controlling the pitch of a propeller vane, for an aircraft turbine engine, characterised in that it comprises:
  a cup comprising an annular wall extending around an axis intended to be a pitch setting axis of the vane, this annular wall comprising a lower axial end enclosed by a bottom wall, and an upper axial end which is open and configured to allow a root of the vane to be mounted inside the cup, the bottom wall being configured to cooperate in a form-fitting manner with a free end of said root in such a way that the cup is secured in rotation to the root around said axis, and
  an immobilisation ring extending around said axis and configured to be mounted around the root, this immobilisation ring being configured to be mounted within the cup and to cooperate with the root and the annular wall of the cup respectively in order to ensure an axial retention of the root within the cup,
  and in that the immobilisation ring is a double dog clutch ring which comprises two annular rows of external dog teeth, a first of these rows of teeth being configured to cooperate by dog clutch with complementary first internal dog teeth of the annular wall of the cup and by axial support with these teeth to ensure the retention of the root in the cup and a second of these rows of teeth being configured to cooperate by dog clutch with complementary second internal dog teeth of the annular wall of the cup and being spaced from these teeth by an axial clearance to ensure a safety in the event of failure of the first row of teeth.

In the present application, a double dog clutch ring is defined as a ring which is equipped with two annular rows of external dog teeth. Each of these rows of teeth is able to cooperate by dog clutch with a row of complementary internal teeth of the cup of the system. The dog clutch is a type of mounting of a part in another by a double displacement of the parts by translation and then by rotation, one with respect to the other. One of the parts is engaged in the other of the parts by axial translation until the teeth move from a position where they are above each other to a position where they are below each other. This is achieved by aligning the teeth of one of the parts with the inter-tooth spaces of the other of the parts to allow the parts to engage with each other. The parts are then displaced in rotation about their axes and relative to each other so that the teeth of the parts are substantially axially aligned and can cooperate with each other by axial abutment.

The first row of dog teeth of the immobilisation ring has the function of ensuring the axial retention of the root in the cup and for this purpose cooperates by axial support with the complementary internal teeth of the cup.

The second row of dog teeth in this ring is designed to ensure a safety of the failsafe type in the event of failure of the first row of teeth.

In other words, the immobilisation ring has an active or main row of dog teeth (the first row of teeth) for retaining the vane root and a passive or secondary row of dog teeth (the second row of teeth) which is not operational in normal operation but is used in the event of failure of the active row of teeth. This redundancy ensures an optimum safety in the retention of the vane root without the need for major system modifications or additional parts. The safety function added to the system therefore does not lead to a significant change in the system and its overall dimension.

The purpose of the invention is thus to introduce a safety element into the design of the attachment of the vane root. This safety element consists not only of a secondary standby force path that allows the vane to be unreleased in the event of failure of the main retention system, but also of a failure detection by the unbalance of the fan caused by the failure of the main retention system. In fact, when the main dog fails, the aforementioned clearance is consumed and the vane is retained by the secondary dog. As the radial position of the vane changes, this introduces an unbalance on the fan which can be detected to indicate the problem.

The system according to the invention may comprise one or more of the following characteristics, taken alone or in combination with each other:
- the first row of teeth is an upper row of teeth intended to be located on the side of the blade of the vane, and the second row of teeth is a lower row of teeth; the second row of teeth is thus intended to be located on the side of the root of the vane;
- the second row of teeth is an upper row of teeth intended to be located on the side of the blade of the vane, and the first row of teeth is a lower row of teeth; the first row of teeth is thus intended to be located on the side of the root of the vane;
- the first and second rows of teeth are axially spaced from each other by a space which is intended to accommodate said first or second internal teeth and which has an axial dimension greater than an axial thickness of those internal teeth.
- the teeth of the first row of teeth have a greater axial thickness than that of the teeth of the second row of teeth;
- the first and second rows of teeth have substantially a same internal diameter and a same external diameter;
- the immobilisation ring comprises an internal cylindrical surface at its internal periphery, this internal cylindrical surface being configured to cooperate by sliding with an external cylindrical surface complementary to the root of the vane or of an element fitted to this root during the double dog clutch, and this internal cylindrical surface being situated inside the first row of teeth or even the second row of teeth;
- the internal cylindrical surface has an axial dimension which is between 90% and 100% of an axial thickness of the teeth of the first row of teeth or a maximum axial thickness of the immobilisation ring;
- the upper portion of the annular wall around which the upper bearing is mounted comprises said first and second teeth at its internal periphery and a thread at its external periphery, a nut being screwed onto this thread and being supported axially on an external ring of this bearing;
  - the ring comprises at its internal periphery a frustoconical surface at least partly complementary to the shape of the root;
  - the ring is sectored and comprises a plurality of angular sectors arranged side by side around said axis;
- the system further comprises:
  - a lower rolling guide bearing extending around said axis and mounted around a lower portion of the annular wall;
  - an upper rolling guide bearing extending around said axis and mounted around an upper portion of the annular wall;
- at least one of the guide bearings has its internal ring integrated with said cup;
- at least one of the guide bearings is angular contact;
- the recess is eccentric with respect to the pitch setting axis;
- the system further comprises an elastically deformable member extending around the pitch setting axis and mounted within the cup, this member being supported axially on the bottom wall and being configured to axially bias the root of the vane outwardly of the cup;
- the system further comprises a locking annulus and an annular snap ring, the locking annulus being configured to be axially engaged between the internal and external dog teeth to prevent the rotation of the dog clutch ring within the cup, and the annular snap ring being mounted in the cup to axially block the locking annulus in the cup;
- the barrel is produced by two half-shells fitted and attached to the body, the half-shells being joined at the level of a joint plane which passes through said pitch setting axis;
- the barrel is glued to the body;
- at least one shrink-fitting ring is mounted around the half-shells to maintain them tightened against the body, this shrink-fitting ring extending around the pitch setting axis;
- a lower shrink-fitting ring is mounted on a low cylindrical surface of the barrel, and extends around at least one portion of the free end of the body;
- upper shrink-fitting ring is mounted on a high cylindrical surface of the barrel, and extends around a portion of a bulb of the body;
- the dog clutch ring is configured to be mounted on the high cylindrical surface of the barrel;
- the first guide bearing extends at least partly around the lower shrink-fitting ring, and the second guide bearing extends at least partly around the upper shrink-fitting ring.

The guide bearings take up the mechanical actions resulting from the aerodynamic and centrifugal forces applied to the vane during operation. The lower bearing can be configured to ensure the centrifugal retention of the vane and the upper bearing can be configured to take up the bending moment resulting from aerodynamic and centrifugal forces. The distance between the bearings along the pitch setting axis generates a sufficient leverage to prevent the vane from swivelling in any phase of flight.

The present invention also relates to an assembly comprising a system as described above and a variable pitch propeller vane, this vane comprising a blade connected to a root, the root comprising a body housed in an annular barrel which extends around a pitch setting axis of the vane.

Said body is preferably solid (i.e. without a recessed hollowed portion). Advantageously, said body comprises a free end located on the opposite side of the blade, this free end being configured to cooperate in a form-fitting manner with the control system. The barrel is preferably independent of the control system.

The present invention also relates to a turbine engine, in particular for an aircraft, comprising at least one system or an assembly as described above.

Finally, the present invention relates to a method for mounting a system as described above:

a) inserting the root of the vane within the cup of the system by displacing the vane in a direction parallel to the pitch setting axis, b) engaging the free end of the root in the recess of the bottom wall of the cup so as to secure in rotation the cup to the root of the vane, and c) engaging the immobilisation ring, previously mounted or present around the root of the vane, in the cup and mounting this ring by double dog clutch in the cup and on the root of the vane so as to ensure the axial retention of the root in the cup.

Advantageously, during the steps a) and/or b), the root of the vane is supported on the elastically deformable member and compresses it axially.

BRIEF DESCRIPTION OF THE FIGURES

Further characteristics and advantages will be apparent from the following description of a non-limiting embodiment of the invention with reference to the appended drawings in which:

FIG. 20 is a partial schematic view in axial section of a first embodiment of a system according to the invention;

DETAILED DESCRIPTION OF THE INVENTION

Figure 1:
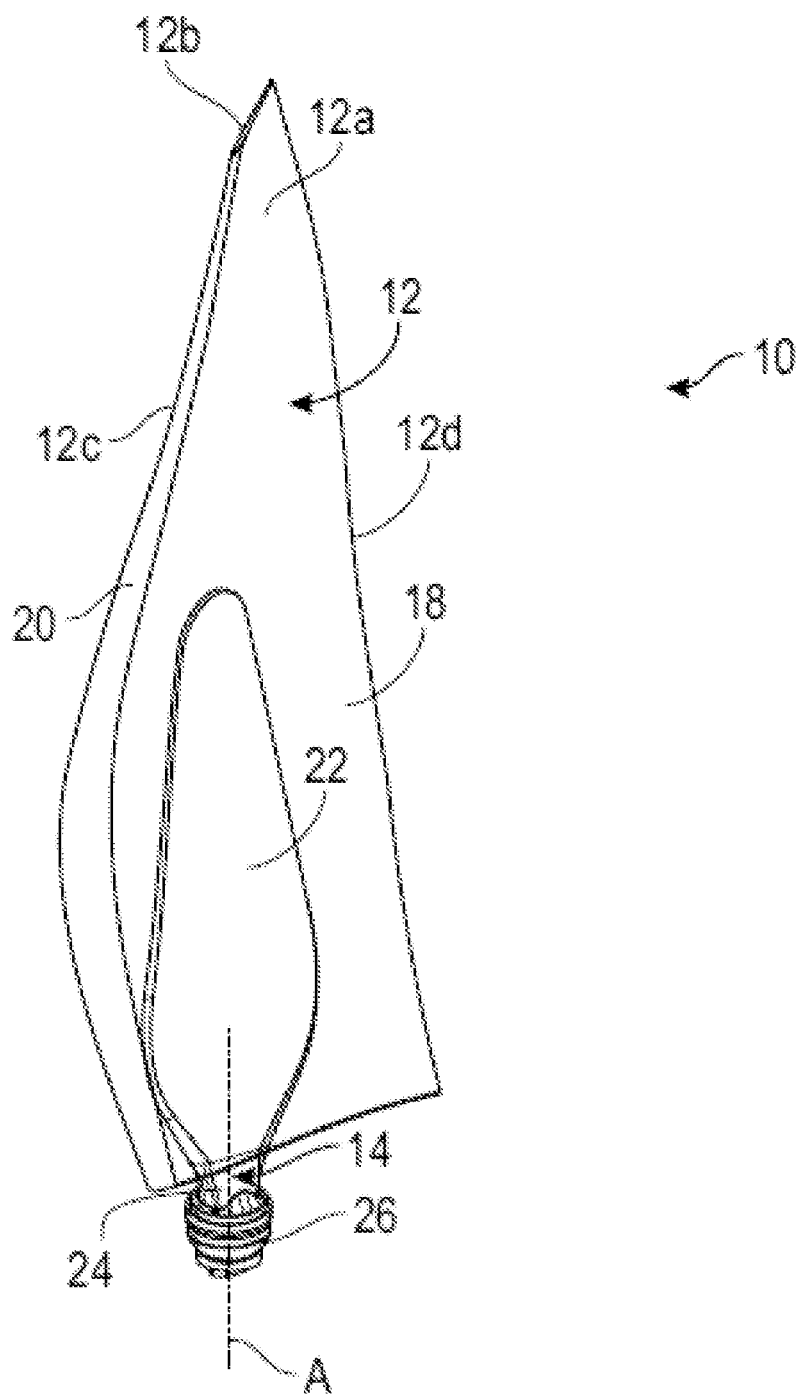
FIG. 1 is a schematic perspective view of a propeller vane for an aircraft turbine engine.
Figure 2:
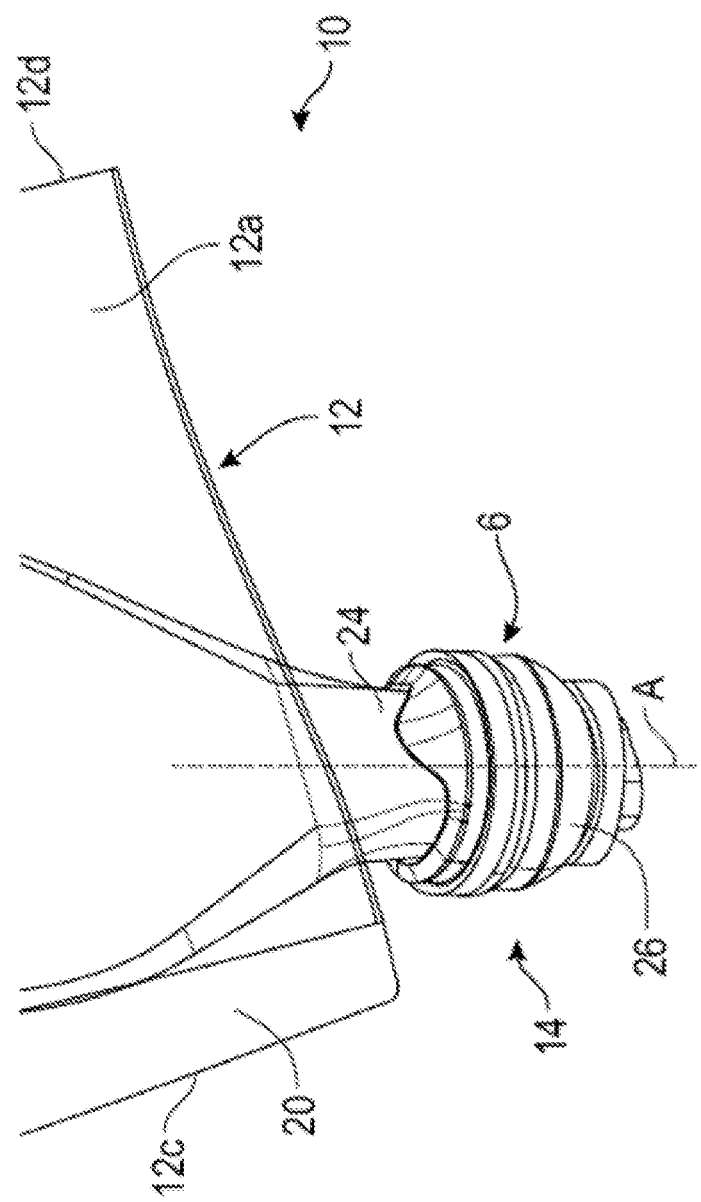
FIG. 2 is a larger scale view of a portion of FIG. 1 and shows the root of the vane.

FIG. 1 shows a vane 10 for a propeller of an aircraft turbine engine, this propeller being either ducted or unducted.

The vane 10 comprises a blade 12 connected to a root 14.

The blade 12 has an aerodynamic profile and comprises an intrados 12a and an extrados 12b which are connected by an upstream leading edge 12c and a downstream trailing edge 12d, the terms upstream and downstream referring to the flow of the gases around the blade in operation.

The blade 12 has an upper end which is free, referred to as summit, and a lower end which is connected to the root 14.

In the example shown, the vane 10 is made of a composite material by an injection method referred to as RTM method (Resin Transfer Molding). This method consists of preparing a fibrous preform 18 by three-dimensional weaving, then placing this preform in a mould and injecting a polymerizable resin, such as an epoxy resin, which will impregnate the preform. After the blade 12 has cured and hardened, its leading edge 12c is usually reinforced by a metal sheath 20 which is fitted and attached, for example by gluing.

The vane 10 here comprises a spar 22 which comprises a portion forming a core of the blade 12 and which is intended to be inserted into the preform 18 prior to the resin injection, and a portion which extends from the side opposite the summit of the blade 14 to form a portion of the root 14, referred to as body 24.

The spar 22 is preferably made of a 3D woven carbon fibre reinforced epoxy organic matrix composite material with the warp direction predominantly radial oriented and the weft predominantly oriented along the chord of the blade at aerodynamic duct height. However, the spar can also be a more mechanically advantageous assembly of different organic matrix composite materials (thermoset, thermoplastic or elastomer) reinforced with long fibres (carbon, glass, aramid, polypropylene) in different fibrous arrangements (woven, braided, knitted, unidirectional).

Although not shown, the blade 12 may be hollow or solid and comprises an internal cavity filled with a foam or honeycomb type filler material. This filler material is installed around the spar 22 and is covered with a skin of organic matrix composite material to increase the impact resistance of the blade.

The sheath 20 may be titanium or titanium alloy, stainless steel, steel, aluminium, nickel, etc. The intrados 12a or even the extrados 12b of the blade 12 may be covered with a polyurethane film for the protection against erosion.

The root 14 comprises essentially two portions, namely this body 24 and an annular barrel 26 which extends around the body 24 and an axis A of the vane.

The axis A is an axis of elongation of the vane 10 and of the blade 12 and in particular a pitch setting axis of the vane, i.e. the axis about which the angular position of the vane is adjusted. It is usually also a radial axis and therefore extends along a radius from the axis of rotation of the propeller equipped with this vane.

The body 24 of the root 14 has a particular shape best seen in FIGS. 3 to 7.

The body 24 essentially comprises three portions:
a free end 28 located on the opposite side to the blade 12,
a stilt 30 located on the side of the blade, and
a bulb 32 located between the free end and the stilt.

Figure 7:
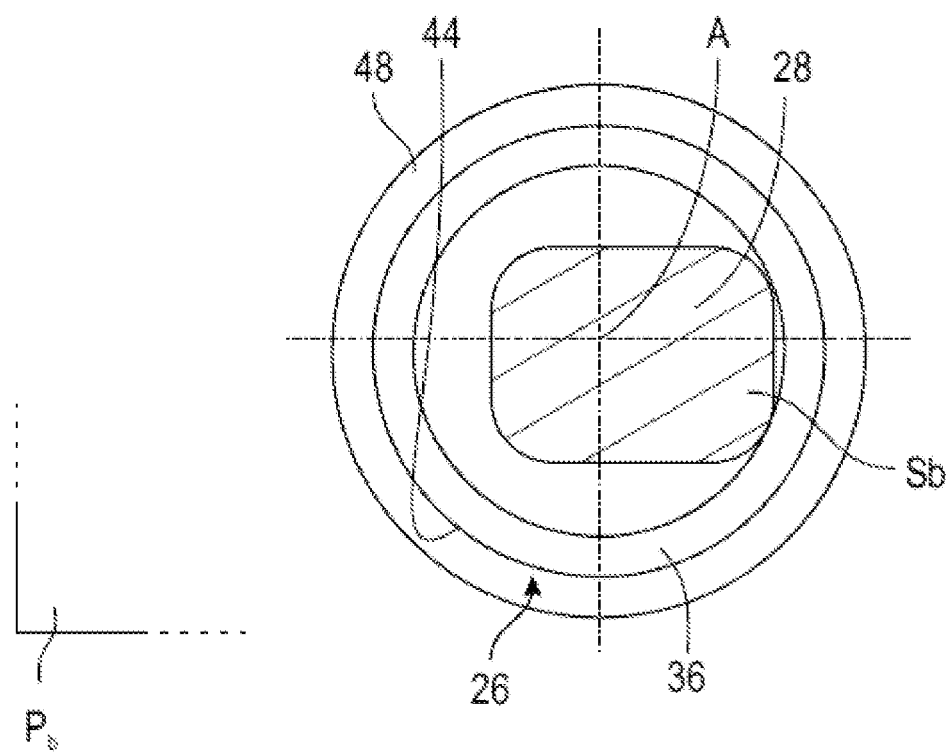
FIG. 7 is another schematic cross-sectional view along the line VII-VII of FIG. 5.

The free end 28 has a generally parallelepiped shape in the example shown. As can be seen in FIG. 7, this end 28 is offset from the axis A to achieve a keying or an indexing, as will be explained in more detail below.

Pb is defined as a transverse plane, i.e. a plane perpendicular to the axis A, passing substantially through the middle of the end 28, measured along the axis A. This plane Pb is referred to as low or lower plane. FIG. 7 shows the section shape of the end 28 in this plane Pb. This section, referred to as low section, has a value or a surface area, for example maximum, denoted Sb and is generally rectangular in shape in the example shown.

As will also be described below, the end 28 is configured to cooperate with a pitch control system 34 for the vane.

Figure 4:
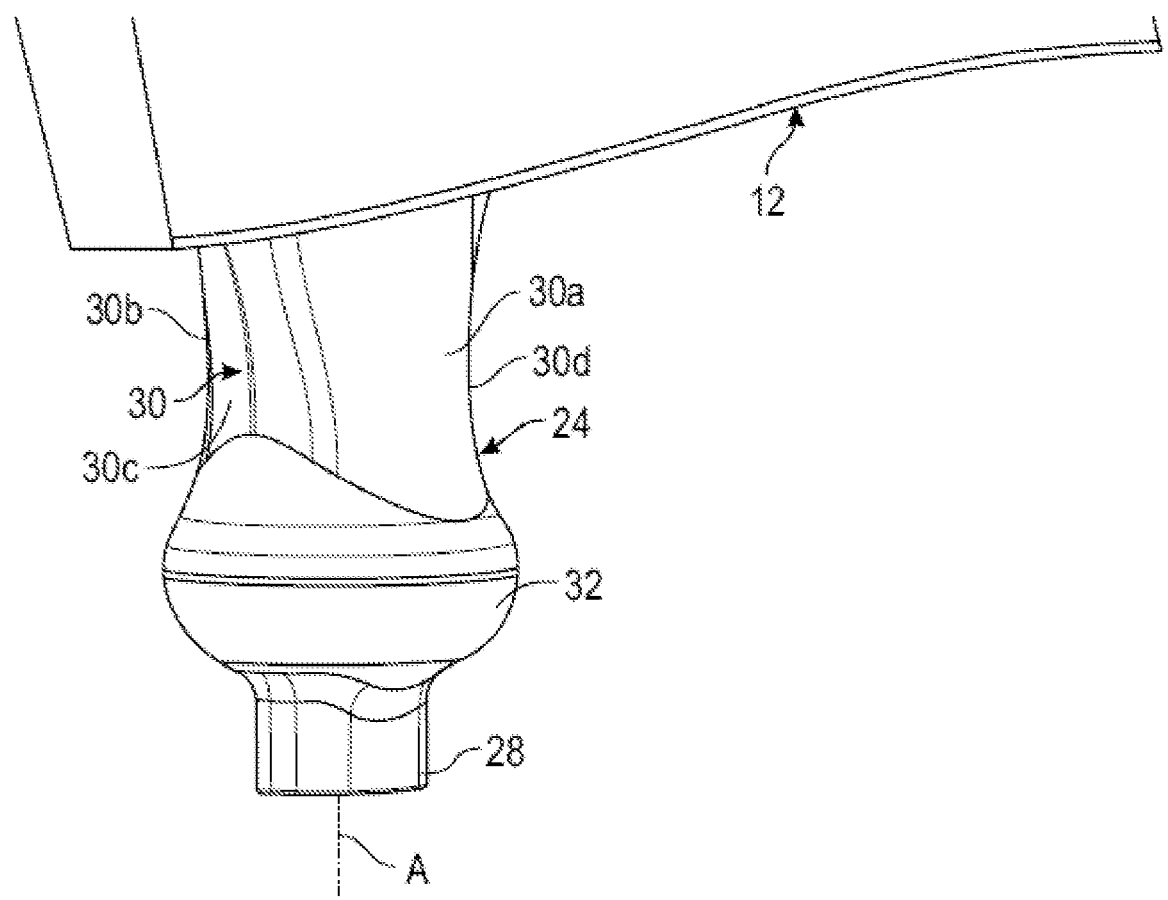
FIG. 4 is a schematic perspective view of the body of the root of the vane in FIG. 1.
Figure 5:
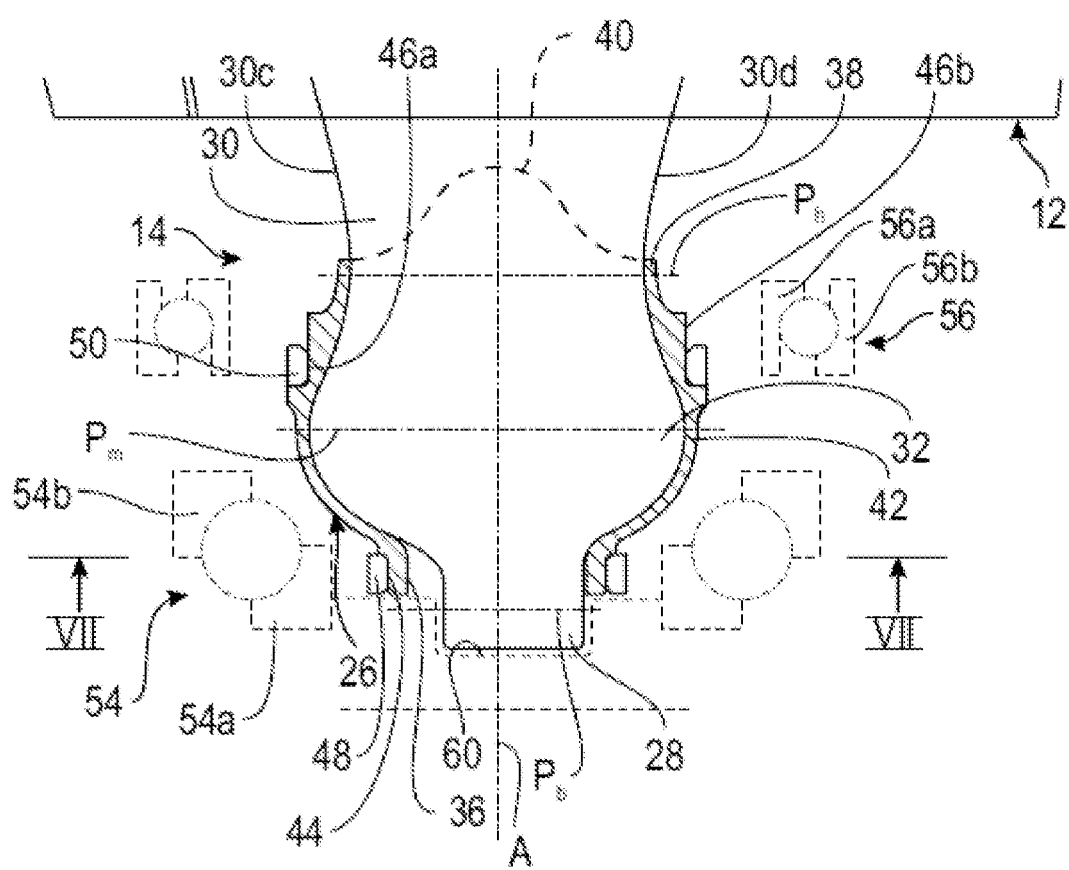
FIG. 5 is a further schematic axial sectional view of the root of the vane of FIG. 1 and guide bearings, the sectional plane extending along a chord of the blade of the vane.

The stilt 30 has a relatively complex shape and can be considered as comprising:
two lateral flanks 30a, 30b, located respectively on the side of the intrados 12a and the extrados 12b of the blade 12, which converge towards each other along the axis A and in the direction of the summit of the blade 12 (cf. FIGS. 4 and 6), and
two edges, respectively upstream 30c and downstream 30d, which on the contrary diverge from each other along the axis A and in the direction of the summit of the blade 12 (cf. FIGS. 4 and 5).

Ph is defined as a transverse plane passing through the stilt 30, and in particular its lower end. This plane Ph is referred to as high or upper plane. In this plane, the stilt may have a non-circular shape in section, for example oval, oblong, square or rectangular. This section, referred to as high section, has a value or a surface area, for example maximum, noted Sh.

The bulb 32 has a generally bulged or domed shape, this bulging or doming extending around the axis A.

Pm is defined as a median plane passing through the bulb 32, and in particular in its largest cross-section portion, which is denoted Sm. This plane Pm is referred to as mean plane. In this plane, the bulb 32 may have a circular shape in section, although this section is not limiting.

It is understood that the plane Pm is located between the planes Pb and Ph. The cross-section of the bulb 32 decreases from the plane Pm (Sm) to the plane Ph, and from the plane Pm towards the plane Pb. It is therefore understood that Sm is greater to Sb and Sh. Furthermore, in the example shown, Sh is greater than Sb.

Figure 3:
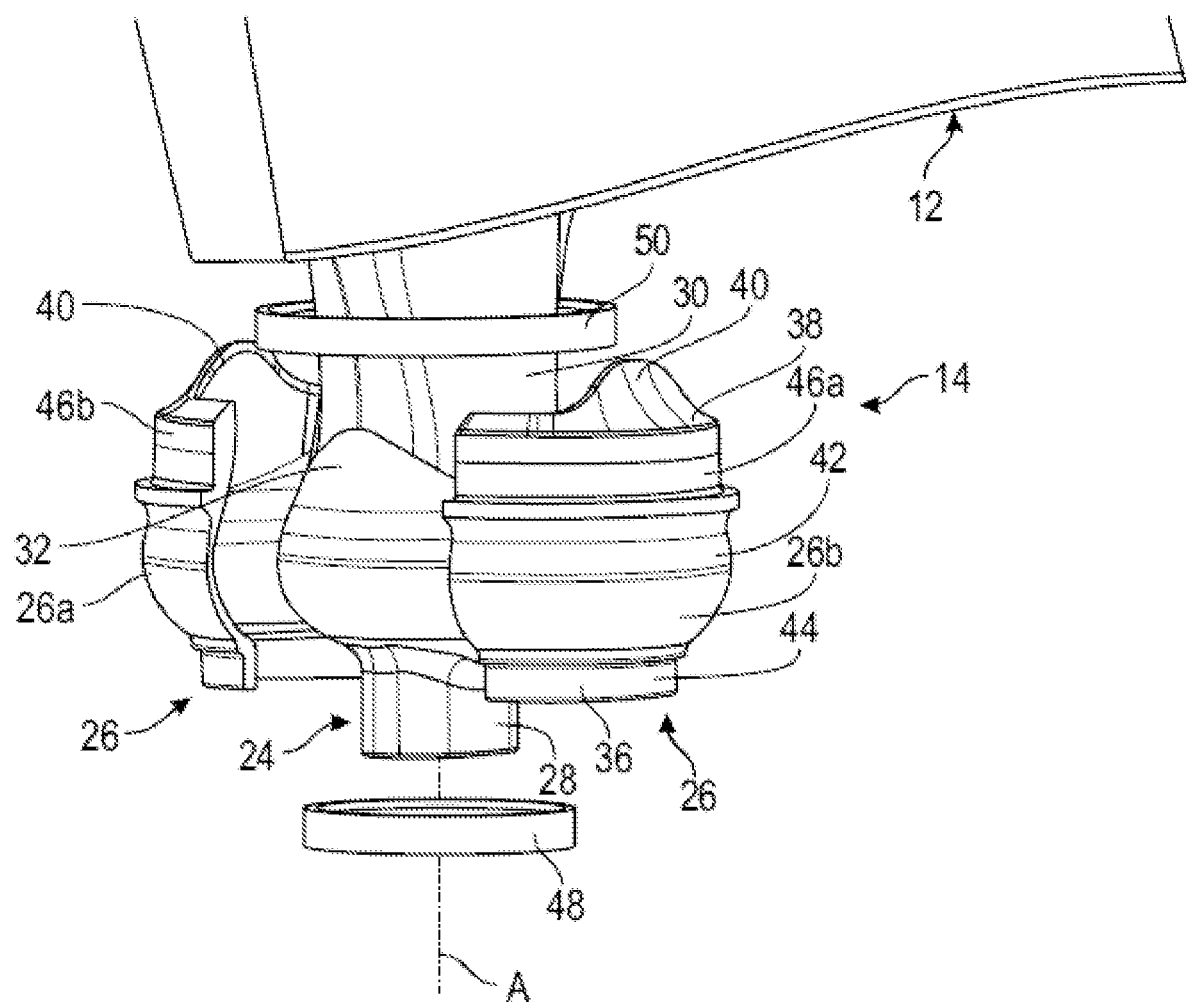
FIG. 3 is a schematic perspective view with partial exploded view of the root of the vane of FIG. 1.

The barrel 26 is produced in two half-shells 26a, 26b, as can be seen in FIG. 3, which are fitted and attached to the body 24, for example one on the side of the intrados 12a of the blade and the other on the side of the extrados 12b of the blade 12. The half-shells 26a, 26b are thus joined at the level of a joint plane which passes through the axis A and extends substantially parallel to a chord of the blade 12.

The barrel 26 is advantageously attached to the body 24, preferably by gluing. The glue extends between the barrel and the body, all around the axis A.

The barrel 26 is preferably metallic (steel, titanium or titanium alloy such as TA6V). The glue is, for example, an epoxy glue filled with thermoplastic or elastomeric nodules or reinforced with a fabric. This gluing method is particularly suitable because of the large contact surface area between the cavity of the barrel and the body, which can be composite. The presence of a glue joint is advantageous because it allows slight form defects to be corrected. The glue joint also allows to prevent the friction at the metal/composite interface and thus increases the service life of the vane.

Several possibilities are envisaged for fitting the barrel 26 to the body 24. A first possibility is to deliberately leave a clearance between the two half-shells 26a, 26b of the barrel 26 once they have been fitted, so that the pressure can be properly applied when the glue joint cures. The curing phase can be done in an autoclave with the entire vane inside a vacuum bag. However, it is also possible to carry out this operation in a press. However, the disadvantage of leaving a clearance between the two half-shells 26a, 26b is that their positioning is less controllable and therefore a rework of the external surface must be carried out. A second possibility is to fit the half-shells one against the other around the body without any existing clearance. This strategy is possible, for example, by machining a blank that has already been cut into two portions and maintained together during the machining operation in order to ensure the geometry of the external surfaces once the half-shells are reassembled. This allows the positioning and the geometry of the external surface of the barrel 26 to be controlled without the need for additional machining after gluing. In any case, positioning pins or stops can be considered to ensure the relative position of the half-shells of the barrel.

The presence of a glue joint between the body and the barrel is, however, not mandatory, although it is very advantageous. Alternatively, pre-stressing washers (or springs) can be used between the barrel and the composite body in order to push the body radially against the bearing surfaces of the barrel. The geometry of the barrel can also be used to slightly "clamp" the body when the two half-shells of the barrel are fitted around the bulb. In this case, it is the deformation of the barrel that generates a pre-stress. A tooling must therefore be provided to maintain this position before final assembly.

Figure 6:
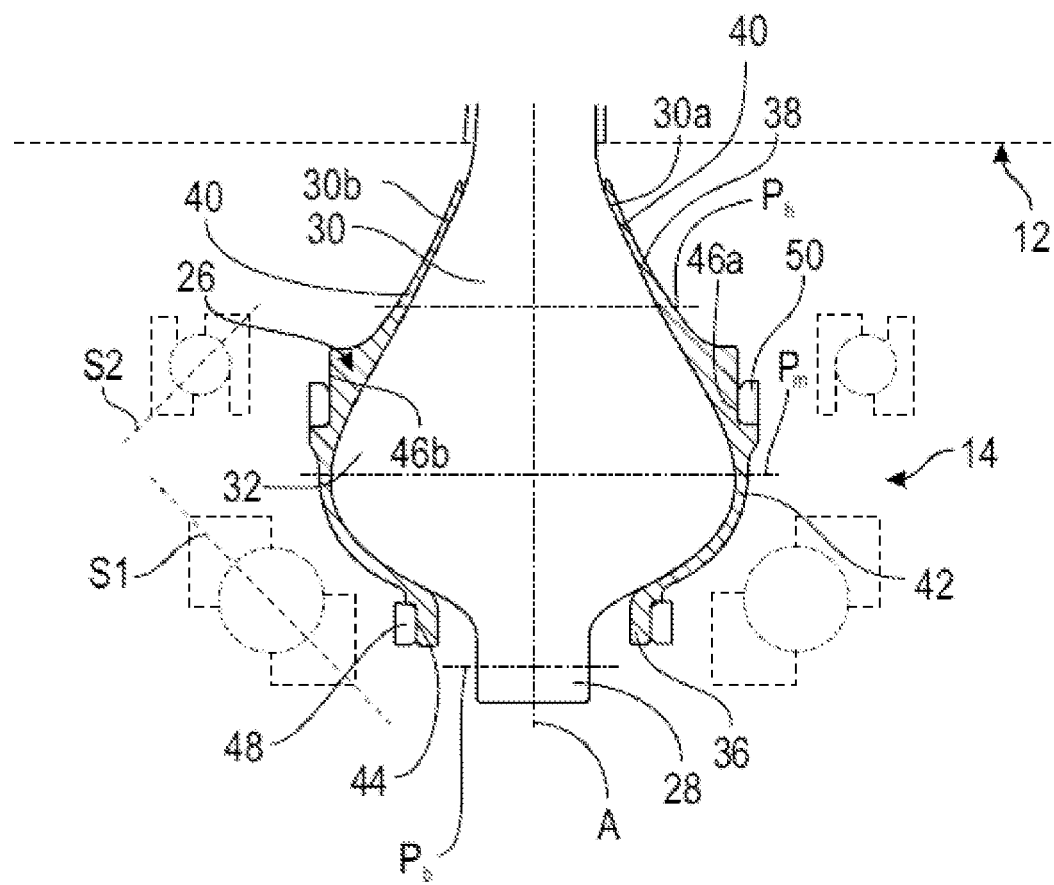
FIG. 6 is a schematic axial sectional view of the root of the vane of FIG. 1 and the guide bearings, with the sectional plane extending transversely to the chord of the blade of the vane.

As can be seen in FIGS. 5 and 6, the barrel 26 covers and conforms to at least one portion of the bulb 32 and of the stilt 30, and has a complementary shape in section to the bulb 32 at the level of the middle section Sm, and to the stilt 30 at the level of the high section Sh.

More specifically, the barrel 26 comprises three portions in the example shown,
a lower end 36 which is generally annular in shape (see FIGS. 5-7) and extends at the level of and around the free end 28 of the root,
an upper end 38 which extends at the level of the plane Ph and which comprises two lateral lips 40 applied to the flanks 30a, 30b of the stilt 30, and
a median portion 42 applied to the bulb 32 and closely conforming its shape.

The lips 40 are supported on the flanks 30a, 30b of the stilt 30 and allow to stiffen the root 14 of the vane and to reinforce its resistance to torsion about the pitch setting axis A.

In addition, they allow energy to be absorbed in the event of an impact on the vane 10, such as the ingestion of a bird. Fillets may be present on these lips to prevent local wear or damage to the body.

The internal surfaces of the barrel 26 that are in contact with the body 24 serve as bearing surfaces. Compared to a broached attachment, the bearing surface is maximised by exploiting the entire circumference of the bottom of the vane. In a broached attachment, only two distinct surfaces of the root of the vane, respectively located on the intrados and the extrados, are supported on bearing surfaces, while the surfaces of the vane root located on the leading edge and on the trailing edge are free. Also in comparison to a broached attachment, the height of the bearing surfaces in the radial direction is much greater, which also contributes to a considerable increase in their surface area. This large support surface allow to reduce the contact pressure in all operating conditions.

The barrel 26 comprises two cylindrical surfaces 44, 46a for mounting shrink-fitting rings 48, 50. The shrink-fitting rings 48, 50 allow to maintain the half-shells 26a, 26b tightened one against the other and to the body 24. The shrink-fitting rings 48, 50 extend around the axis A.

The surface 44 is located on the lower end 36 and is oriented radially outwards with respect to the axis A. It receives the ring 48 by shrink-fitting, which is engaged from below and is supported axially on a cylindrical bearing surface located at the junction of the end 36 and the median portion 42 of the barrel 26.

The surface 46a is located on the median portion 42 and is oriented radially outwards with respect to the axis A. It receives the ring 50 by shrink-fitting, which is engaged from above and is supported axially on a cylindrical bearing surface located near the plane Pm.

It can be seen that the surface 46a is located immediately adjacent to a cylindrical surface 46b which is intended to receive an immobilisation ring 52, as will be described in the following.

The surfaces 44, 46a and the rings 48, 50 have different diameters in the example shown. The surface 46a has a larger diameter than that of the surface 44 and therefore the ring 50 has a larger diameter than that of the ring 48.

The surfaces 46a, 46b may have the same or different diameters. The surface 46b may for example have a slightly smaller diameter than that of the surface 46a. This is in particular the case where the ring 50 should be mounted with a predetermined radial clearance with respect to this surface 46b.

It can be seen from FIGS. 5 and 6 that the ring 50 is located between the planes Ph and Pm, and the ring 48 is located between the planes Pm and Ps.

FIGS. 5 and 6 also show the position of the rings 48, 50 and the planes Pm, Ph, Ps in relation to rolling bearings 54, 56 which extend around the axis A and the root 14.

The bearings 54, 56 are here two in number and are respectively a lower bearing 54 and an upper bearing 56.

The bearings 54, 56 are of the ball rolling type. In the example shown, they have different diameters and their balls also have different diameters.

The bearing 54 extends substantially between the planes Pm and Pb and thus around a lower portion of the bulb 32. It also extends around the ring 48. This bearing 54 has a smaller diameter than the other bearing 56, and theirs balls have a larger diameter than those of the other bearing 56.

The bearing 54 is also angular contact. In the example shown, the support points or surfaces of the balls on the raceways of their rings 54a, 54b are located on a frustoconical surface S1 which extends along the axis A and whose largest diameter is located on the side of the summit of the vane.

The bearing 56 extends substantially between the planes Pm and Ph and thus around an upper portion of the bulb 32. It also extends around the ring 50. The bearing 56 is also angular contact. In the example shown, the support points or surfaces of the balls on the raceways of their rings 56a, 56b are located on a frustoconical surface S2 which extends along the axis A and whose largest diameter is located on the side of the free end of the root of the vane.

The position of the middle section between the two bearings 54, 56 is very advantageous in terms of radial overall dimension because a portion of the bearing surface height between the middle section and the high section is located inside the cup 58, unlike the prior art on the broached attachment integrated in a pivot. This helps to reduce the radial overall dimension of the control system 34.

FIGS. 8 to 17 illustrate an example of an embodiment of the system and in particular of the immobilisation ring 52.

The system 34 comprises a cup 58 comprising an annular wall 58a extending about the axis A. This wall 58a comprises a lower axial end enclosed by a bottom wall 58b, and an upper axial end which is open and configured to permit the mounting of the root 14 of the vane within the cup.

The bottom wall 58b is configured to cooperate in a form-fitting manner with the free end of the root 14, and thus with the end 28 of the body 24, so that the cup is secured in rotation to the root about the axis.

Figure 8:
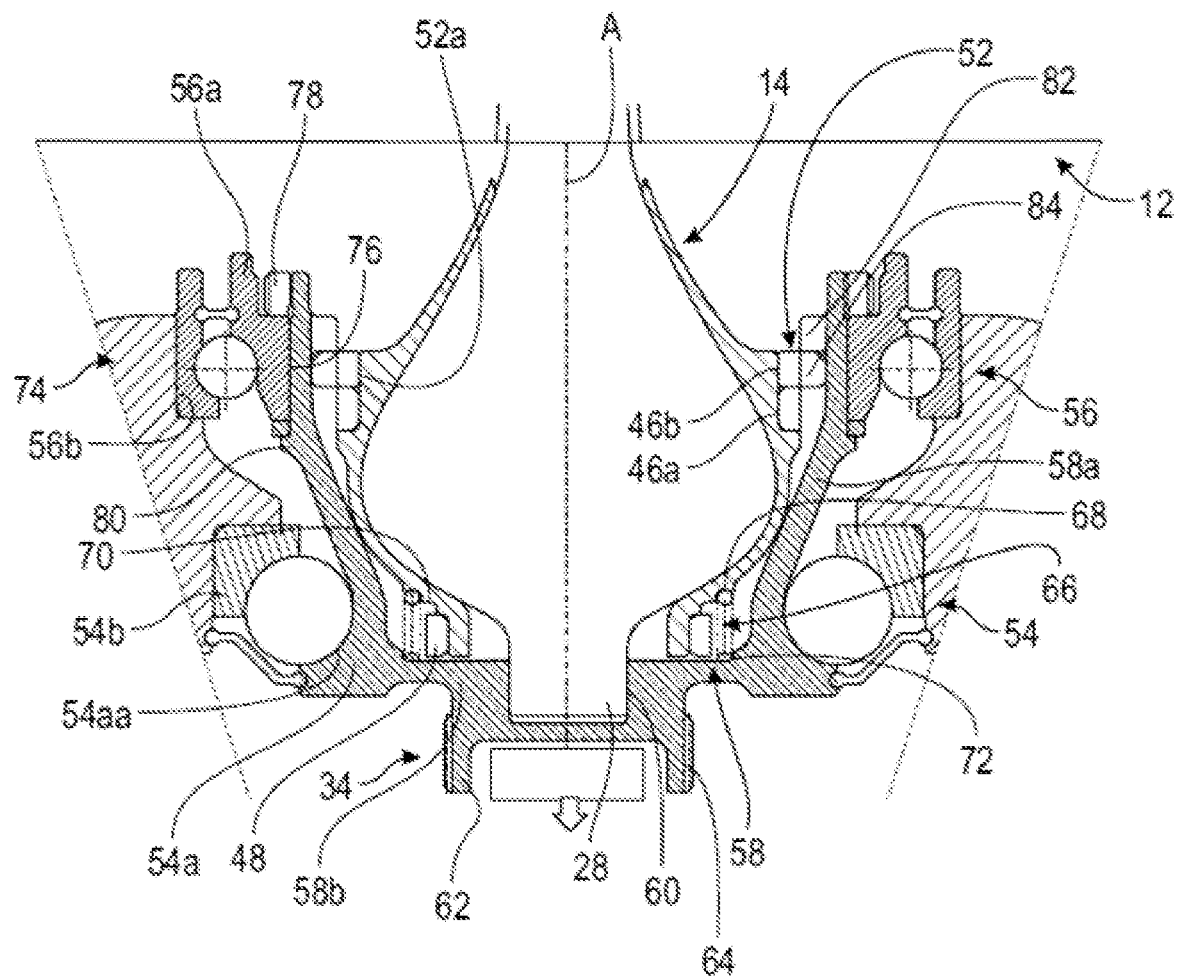
FIG. 8 is a schematic axial sectional view of the vane root of FIG. 1 and a system for controlling the angular pitch of this vane.

In the present case, it is understood that the bottom wall 58b comprises a recess 60 having a non-circular, and in particular rectangular, cross-section and configured to receive the end 28 (FIG. 8). As can be seen in FIG. 5, this recess 60 is eccentric with respect to the axis A in a similar way to the end 28 (see FIG. 7). This eccentricity allows an indexing and a keying when inserting and mounting the root into the cup 58, with only one engagement position of the end 28 in the recess 60 being possible.

The recess 60 is located on an upper or internal face of the bottom wall 58b of the cup 58, which is thus located inside the cup and oriented towards the root.

The system 34 generates a torque at the vane root that counteracts the torsional moment resulting from aerodynamic and centrifugal forces. The end 28 of the root 14 could be enveloped in the barrel 26, like the rest of the body 24 of the root 14. In this case, it would also have a non-circular shape to constrain its rotation. However, it is advantageous to let this end of the body protrude from the barrel, as mentioned above, in order to directly constrain the rotation of the body. This provides a more direct force path, with the torsional moment applied directly to the body. The low section has dimensions strictly smaller than the maximum dimension of the middle section in order to limit the circumferential overall dimension to this height. As a result, the barrel also has a smaller circumferential overall dimension at this height than at the level of the middle section. This allows to reduce the diameter of the lower bearing which is located below the middle section. Thus, the vane root can be integrated lower radially, which greatly reduces the theoretical hub ratio associated with the integration of the root. It is known to the person skilled in the art that a low hub ratio improves the performance of the engine, in particular as it is more compact and therefore lighter. This last point is a very important advantage of the technical solution compared to the competition, which traditionally proposes barrels with cylindrical external shape.

The bottom wall 58b comprises a lower or external face, which is located on the opposite side of the root 14, and which comprises a cylindrical extension 62 extending along the axis A and comprising an external threads or external straight splines 64 for the rotational coupling of the system with a pitch change mechanism which is not illustrated and which is common to the different systems 34 and vanes 10 of the propeller.

An elastically deformable member 66, such as a helical spring, extends around the axis A and is mounted within the cup 58. This member 66 is supported axially on the upper surface of the bottom wall 58b, at the external periphery of this surface in the example shown, and is configured to axially bias the root of the vane towards the outside of the cup i.e. towards the side of the summit of the vane.

The member 66 is supported on a cylindrical bearing surface 68 of the barrel 26. In the example shown, the member 66 is centred by engaging its upper end on and around a cylindrical rim 70 of the barrel, and by engaging its lower end on and around a cylindrical rim 72 of the cup located at the external periphery of the bottom wall 58b.

The member 66 here extends around the shrink-fitting ring 48.

As can be seen in FIG. 8, the cup 58 is designed to support the bearings 54, 56 which ensure the centring and the guiding of the cup about the axis A with respect to a casing 74 or a stationary structure of the turbine engine.

The bearings 54, 56 may be part of the control system. In particular, at least one of the guide bearings may have its internal ring integrated into the cup.

This is the case for the lower bearing 54 which has its internal ring 54a integrated into the cup 58. In practice, this means that the cup comprises a raceway 54aa at its external periphery on which the balls of the bearing 54 roll directly. This raceway comprises an annular surface with a concave curved section. This raceway is located at the lower end of the cup and of the wall 58a. The external ring 54b of the bearing 54 is attached to the casing 74, for example by shrink-fitting. Furthermore, the cup 58 is advantageously designed to apply a pre-stress to the bearing 54.

The external ring 56b of the bearing 56 is attached to the casing 74, for example by shrink-fitting. Its internal ring 56a is engaged on and around the free upper end of the cup 58 and of the wall 58a. This end of the wall 58a comprises an external cylindrical surface 76 for mounting the internal ring 56a as well as an external thread for screwing on a nut 78 intended to be supported axially on the internal ring 56a to maintain it tightened axially against an external cylindrical shoulder 80 of the cup 58.

The wall 58a of the cup further comprises at its internal periphery means configured to cooperate with the aforementioned immobilisation ring 52.

The immobilisation ring 52 extends around the axis A and is configured to be mounted around the root 14. This immobilisation ring 52 is configured to be mounted within the cup and to cooperate respectively with the root 14 and the annular wall 58a of the cup 58 in order to ensure the axial retention of the root in the cup.

In the example embodiment of FIGS. 8 to 17, this immobilisation ring 52 is a dog clutch ring which comprises external dog teeth 84 configured to cooperate with complementary internal dog teeth 82 of the annular wall 58a of the cup 58.

Figure 9:
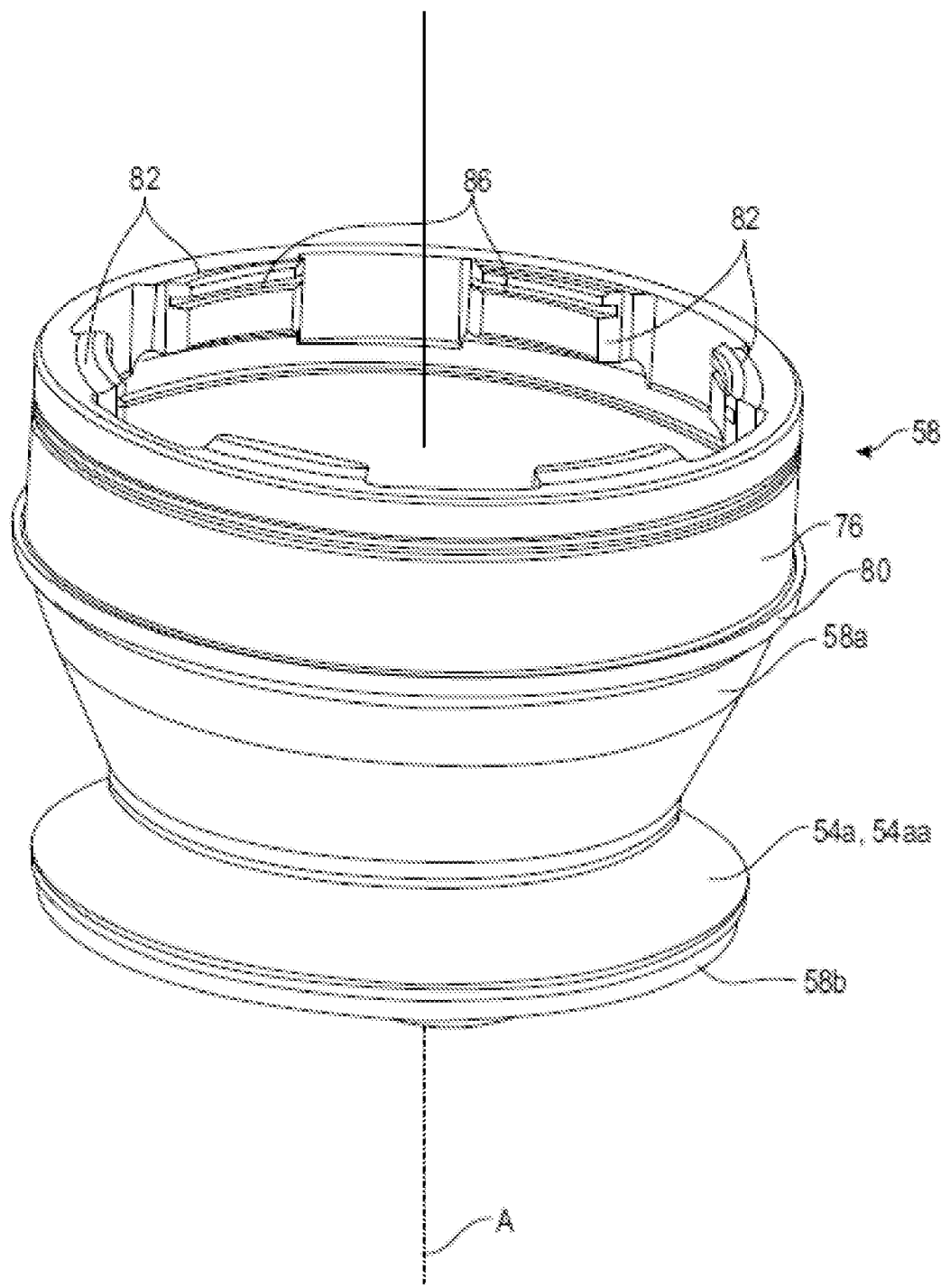
FIG. 9 is a schematic perspective view of a cup of the system in FIG. 8.

The teeth 82 of the cup 58 are best seen in FIG. 9. These teeth are evenly spaced around the axis A. There are six of them in the non-limiting example shown. For example, they each have an angular extension around the axis A of between approximately 20 and 30°.

Each of the teeth 82 comprises a groove 86 at its internal periphery which is circumferentially oriented with respect to the axis A. The grooves 86 of the teeth 82 form a discontinuous gorge around the axis A.

Figure 10:
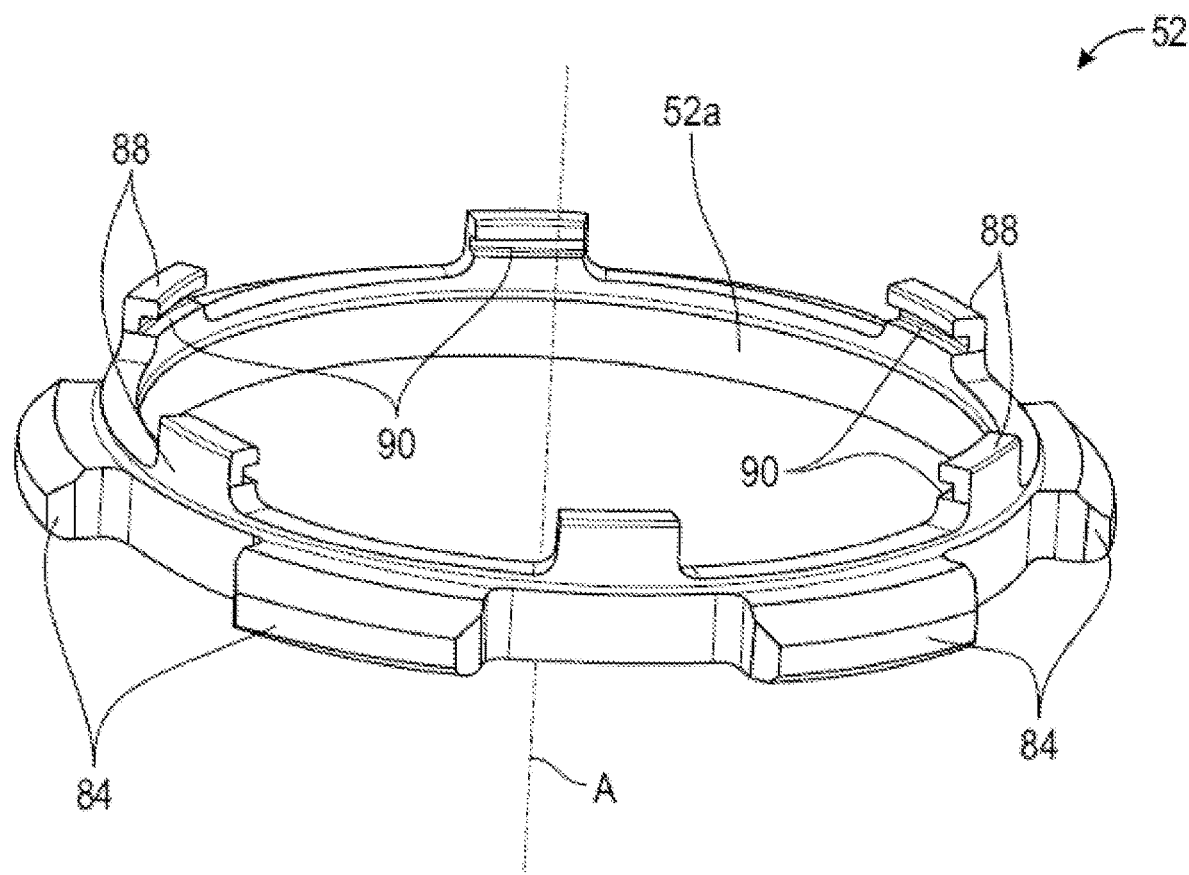
FIG. 10 is a schematic perspective view of a dog clutch ring of the system in FIG. 8.

The dog clutch ring is best seen in FIG. 10. Its teeth 84 are regularly spaced around the axis A. There are six teeth in the non-limiting example shown. For example, they each have an angular extension around the axis A of between approximately 20 and 30°.

The teeth 84 are complementary to the teeth 82 and are configured to cooperate by dog clutch with these teeth. The dog clutch is a well-known method of mounting in the aeronautical field and will be illustrated by FIGS. 12 to 17 showing a mounting method.

The ring 52 comprises an internal cylindrical surface 52a intended to cooperate by sliding with the aforementioned surface 76 of the cup 58.

The ring 52 comprises a second set of teeth 88, which extend axially upwards on the side of the summit of the vane 10. These teeth 88 are also regularly spaced around the axis A. There are six of them in the example shown. They may be staggered in relation to the teeth 84, i.e. the teeth 88 are axially aligned with the circumferential spaces between the teeth 84. As a non-limiting example, the teeth 88 each have an angular extension around the axis A of between approximately 10 and 20°.

Each of the teeth 88 comprises at its internal periphery a groove 90 oriented circumferentially with respect to the axis A. The grooves 90 of the teeth 88 form a discontinuous gorge around the axis A.

Figure 11:
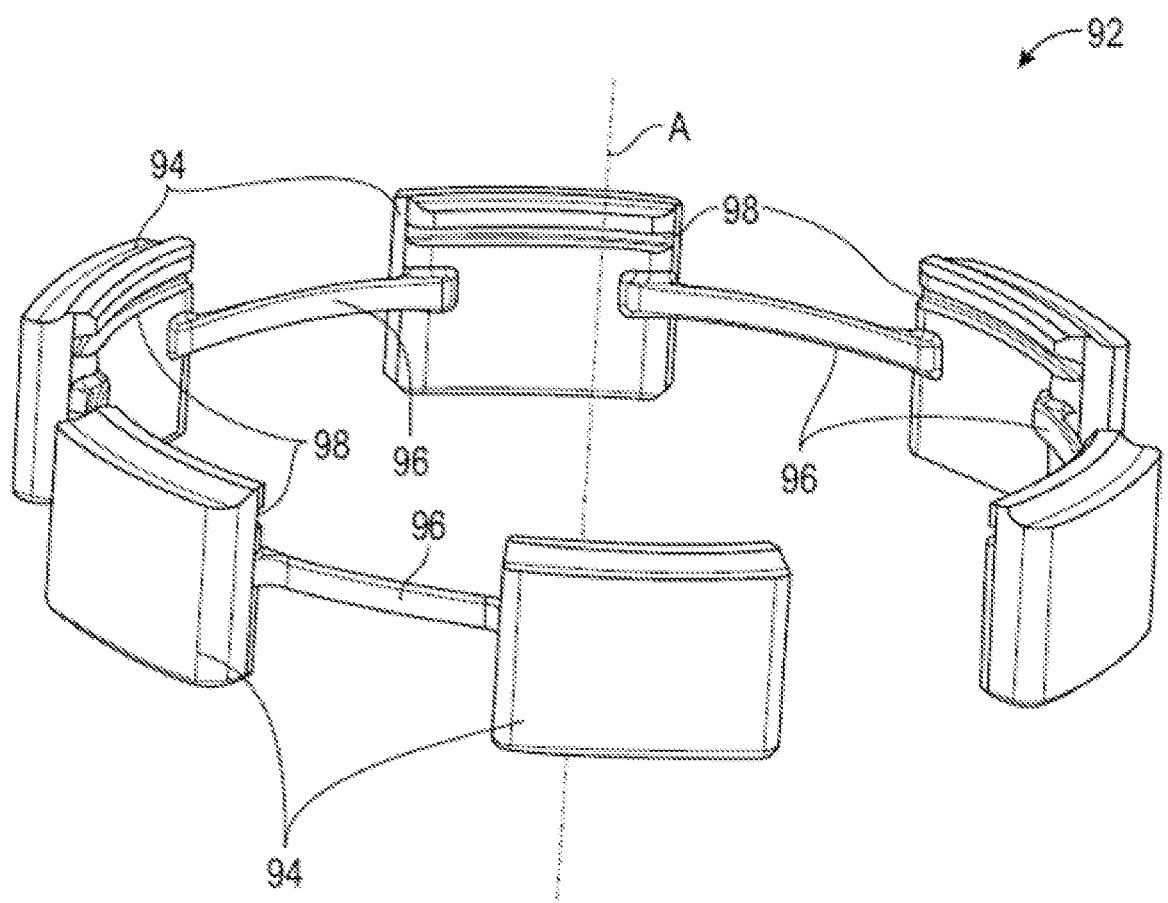
FIG. 11 is a schematic perspective view of a locking annulus of the system in FIG. 8.

FIG. 11 shows a locking annulus 92 which is configured to be axially engaged between the dog teeth 82, 84 to prevent the rotation of the ring 52 within the cup 58.

This annulus 92 comprises skids 94, here six in number in the non-limiting example shown, intended to be engaged in the inter-tooth spaces extending between the teeth 82 and 84. It is therefore understood that these skids 94 have complementary shapes to those of these spaces and are regularly spaced around the axis A.

In the example shown, the skids 94 are secured to each other by bridges 96 extending circumferentially between the skids 94. The bridges 96 are five in number and each extend between two adjacent skids 94. Two of the skids 94 are deliberately not connected together by a bridge so that the annulus 92 is open. This can simplify assembly by moving these skids away from or towards each other when mounting the annulus in the system 34.

Each of the skids 94 comprises a groove 98 at its internal periphery, oriented circumferentially with respect to the axis A. The grooves 98 in the skids 94 form a discontinuous gorge around the axis A.

Figure 17:
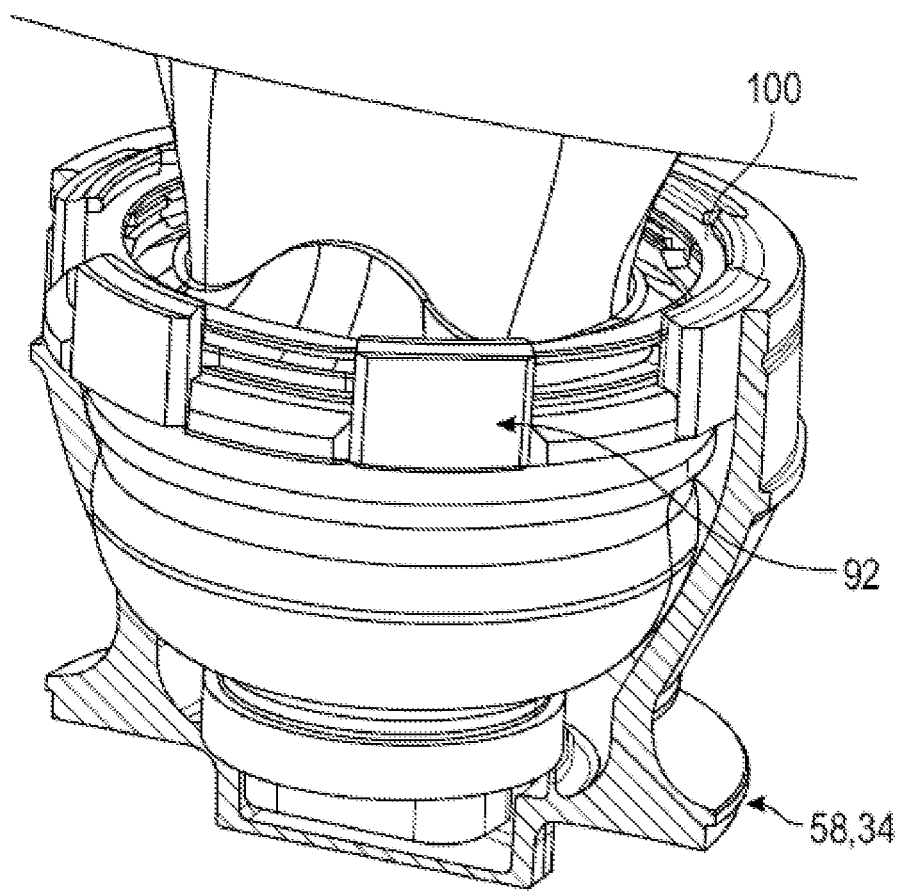
FIG. 17 is a schematic perspective and in partial axial sectional view of the root of the vane and of the system of FIG. 8, and shows a sixth mounting step.

The system further comprises an annular snap ring 100 which is only visible in FIG. 17.

The snap ring 100 is mounted in the cup 58 to axially block the locking annulus 92 in the cup 58. The snap ring 100 may also be split or open to facilitate its mounting and is intended to be engaged in the grooves 86 of the teeth 82 of the cup as well as the grooves 98 of the skids 94 of the annulus 92, when these grooves 86, 98 are all located in a same plane perpendicular to the axis A and are arranged circumferentially with respect to each other to form a complete gorge around the axis A (cf. FIGS. 16 and 17).

Reference is now made to FIGS. 12 to 17 which illustrate a method for mounting the assembly formed by a vane 10 as shown in FIG. 1 and a system 34 as shown in FIG. 8.

Figure 12:
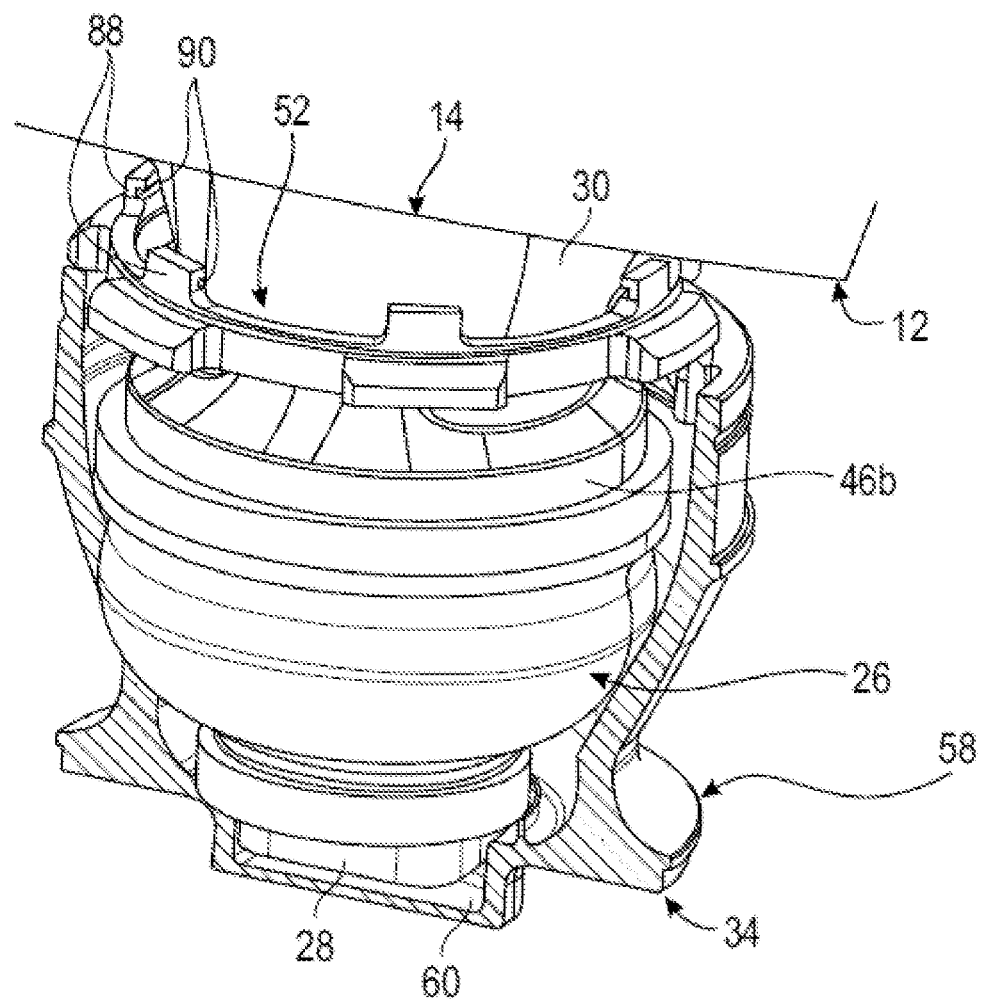
FIG. 12 is a schematic perspective and in partial axial sectional view of the root of the vane and of the system of FIG. 8, and shows a first mounting step.

In the first step shown in FIG. 12, the root 14 of the vane 10 is engaged in the cup 58 of the system 34 by axial translation along the axis A, until the end 28 of the body 24 of the root engages in the recess 60 of the cup 58. As can be seen in the drawing, the ring 52 is already mounted captive around the stilt 30 of the body of the root. Although not shown in this figure, the member 66 (FIG. 8) is compressed when the root 14 is inserted into the cup 58.

Figure 13:
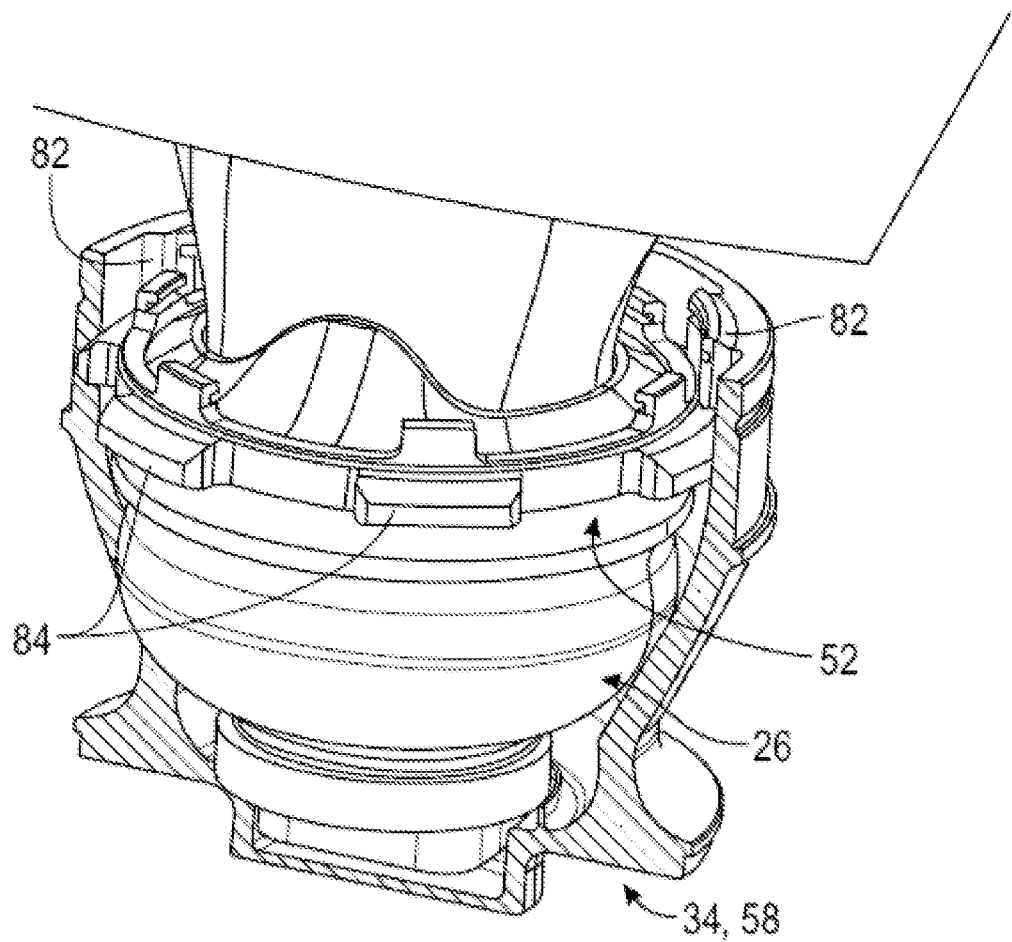
FIG. 13 is a schematic perspective and in partial axial sectional view of the root of the vane and of the system of FIG. 8, and shows a second mounting step.

In the second step illustrated in FIGS. 12 and 13, the ring 52 is angularly positioned about the axis A so that its teeth 84 are aligned with the spaces located between the teeth 82 of the cup. The ring 52 is then displaced in axial translation within the cup 58 until the ring 52 is engaged on the surface 46b of the barrel 26 and the teeth 84 are located just below the teeth 82, as shown in FIG. 13. The grooves 90 provided on the teeth can be used to grip the ring 52 with a suitable tool.

Figure 14:
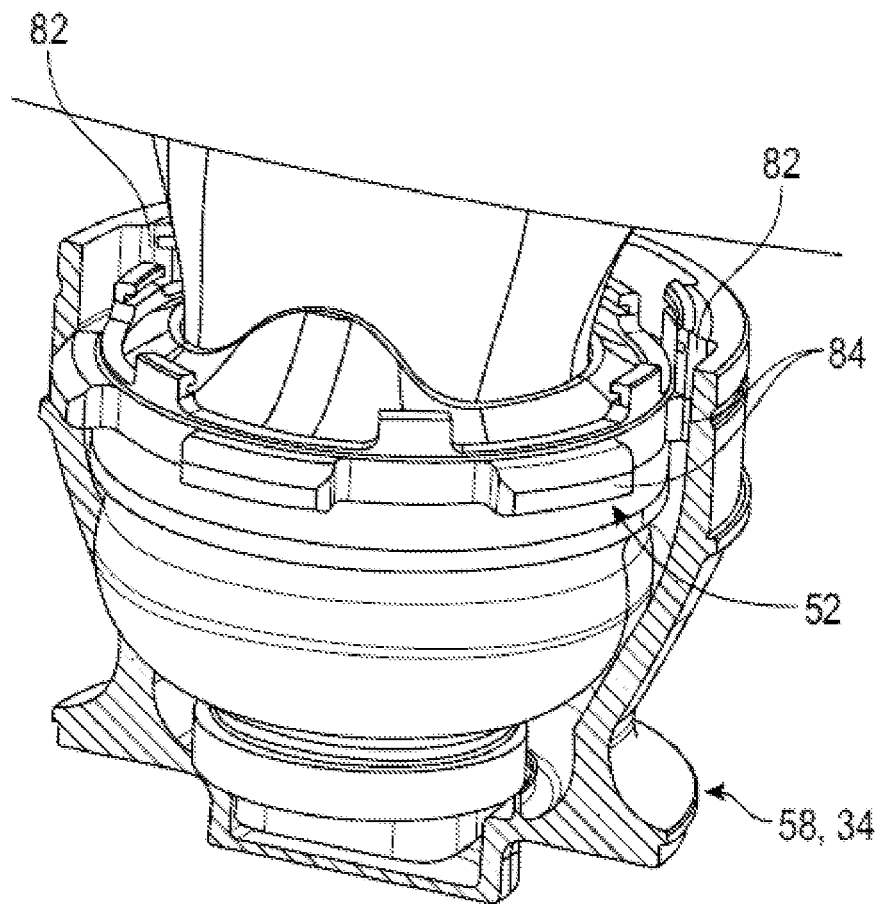
FIG. 14 is a schematic perspective and in partial axial sectional view of the root of the vane and of the system of FIG. 8, and shows a third mounting step.

In the third step illustrated in FIGS. 13 and 14, the ring 52 is displaced in rotation about the axis A so that these teeth 82, 84 are axially aligned with each other. Due to the angular extension of the teeth in the example shown, this angular displacement is in the order of 25-30°. The teeth 88 can be used to grip the ring 52 and rotate it by the aforementioned tool. The member 66, not shown, bias the root axially outwards from the cup, causing the teeth 84 to be supported axially on the teeth 82. The root is thus maintained axially inside the cup and the system 34. In operation, the centrifugal forces applied to the vane are transmitted by the teeth 82, 84 to the cup 58, these forces being directly taken up by the bearing 54 whose internal ring 54a is integrated into the cup 58.

Figure 15:
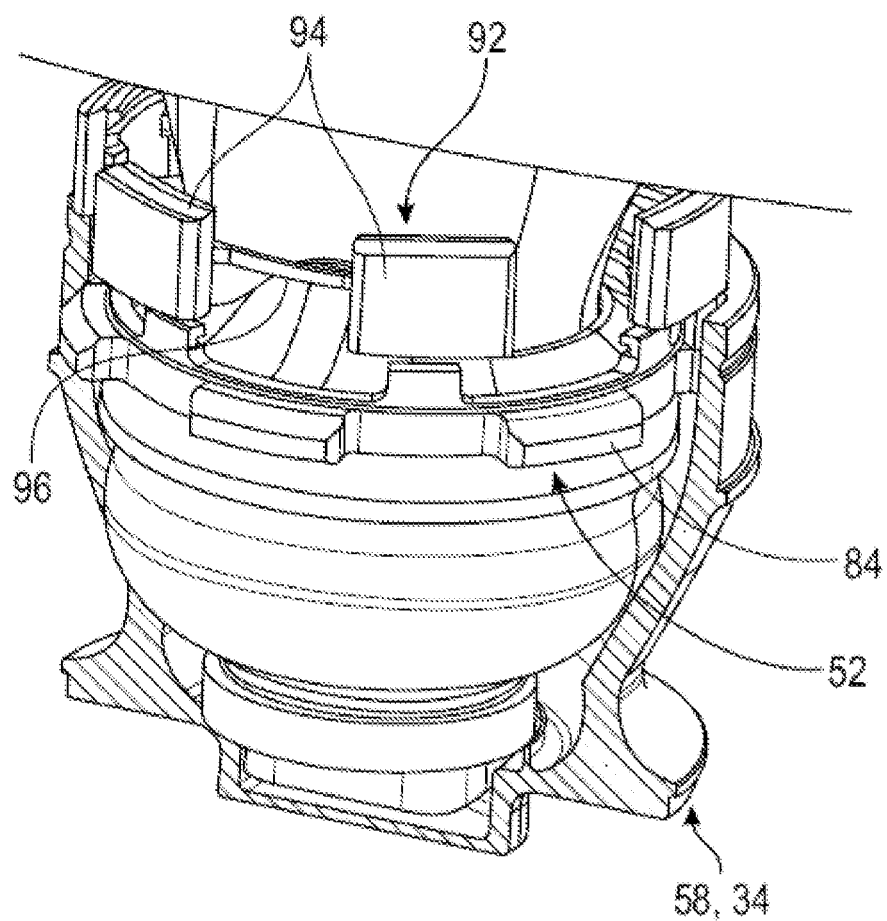
FIG. 15 is a schematic perspective and in partial axial sectional view of the root of the vane and of the system of FIG. 8, and shows a fourth mounting step.
Figure 16:
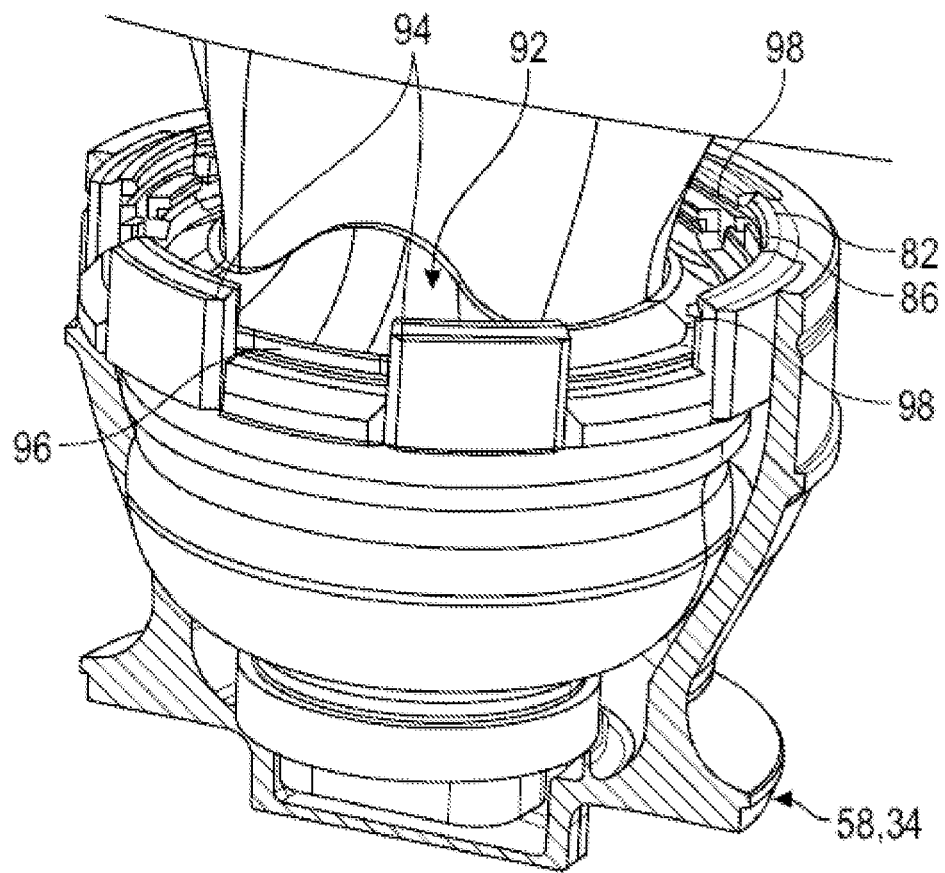
FIG. 16 is a schematic perspective and in partial axial sectional view of the root of the vane and of the system of FIG. 8, and shows a fifth mounting step.

In the fourth step illustrated in FIGS. 15 and 16, the annulus 92 is angularly positioned about the axis A so that its skids 94 are aligned with the spaces located between the teeth 82, 84. The annulus 92 is then displaced in axial translation within the cup 58 until the skids 94 are engaged in these spaces. The bridges 96 can then be supported on the teeth 84 of the ring 52. The annulus 92 thus prevents any rotation of the ring 52 inside the cup 58.

In the final step shown in FIG. 17, the snap ring 100 is engaged in the grooves 86, 98 circumferentially aligned with each other. The snap ring 100 prevents an accidental dismounting of the annulus 92.

It is understood that the dismounting of the vane is carried out by carrying out the aforementioned steps in reverse order. It is also understood that one of the essential steps in the mounting and dismounting of the root is the immobilisation ring 52. This ring 52 can be manipulated from the outside of a turbine engine, which is particularly advantageous during a maintenance operation. A vane can be dismounted and removed from the propeller by dismounting and removing a minimum number of parts.

Figure 18:
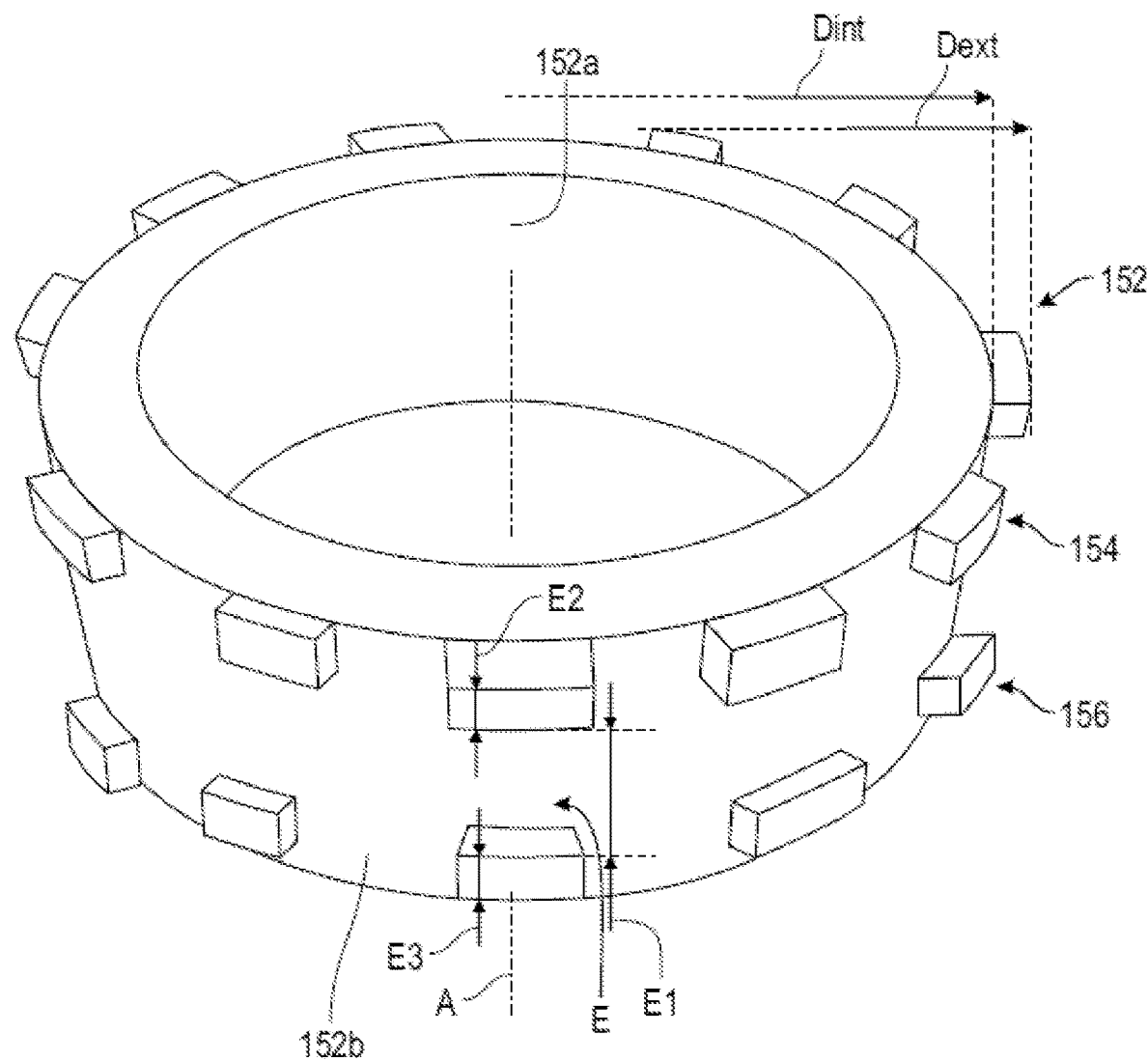
FIG. 18 is a schematic perspective view of an immobilisation ring with double row of dog clutch teeth for a system according to the invention for controlling the angular pitch of a vane.

Reference is now made to FIG. 18, which illustrates an example of embodiment of a double dog clutch ring 152 for a control system 34 according to the invention.

The ring 152 comprises an annular body which comprises at its internal periphery an internal cylindrical surface 152a and at its external periphery two annular rows of external dog clutch teeth, referenced 154 and 156.

The row of teeth 154 is located at an upper end of the ring 152 and is intended to be located on the side of the blade 12 of the vane 10 in a mounting position around the root 14 of the vane 10.

The row of teeth 156 is located at a lower end of the ring 152.

The rows of teeth 154, 156 are separated from each other by a space E which has an axial dimension noted E1. This dimension E1 is measured along the axis of revolution of the ring 152, which is coincident with the pitch setting axis A of the vane 10 in its mounting position.

The row of teeth 154 has an axial thickness E2 measured along that axis and the row of teeth 156 has an axial thickness E3 measured along that axis.

The teeth of both rows 154, 156 may extend radially outwardly with respect to the axis A from a common external cylindrical surface 152b. The rows of teeth 154, 156 then have the same or similar internal diameters Dint. The rows of teeth 154, 156 may also have the same or similar external diameters Dext.

The number of teeth in each row 154, 156 and their angular extent can be chosen in particular according to the desired mechanical strength of the ring 152.

The angular position of the teeth in one row relative to the teeth in the other row depends on the type of mounting for the ring 152 envisaged.

Figure 19A:
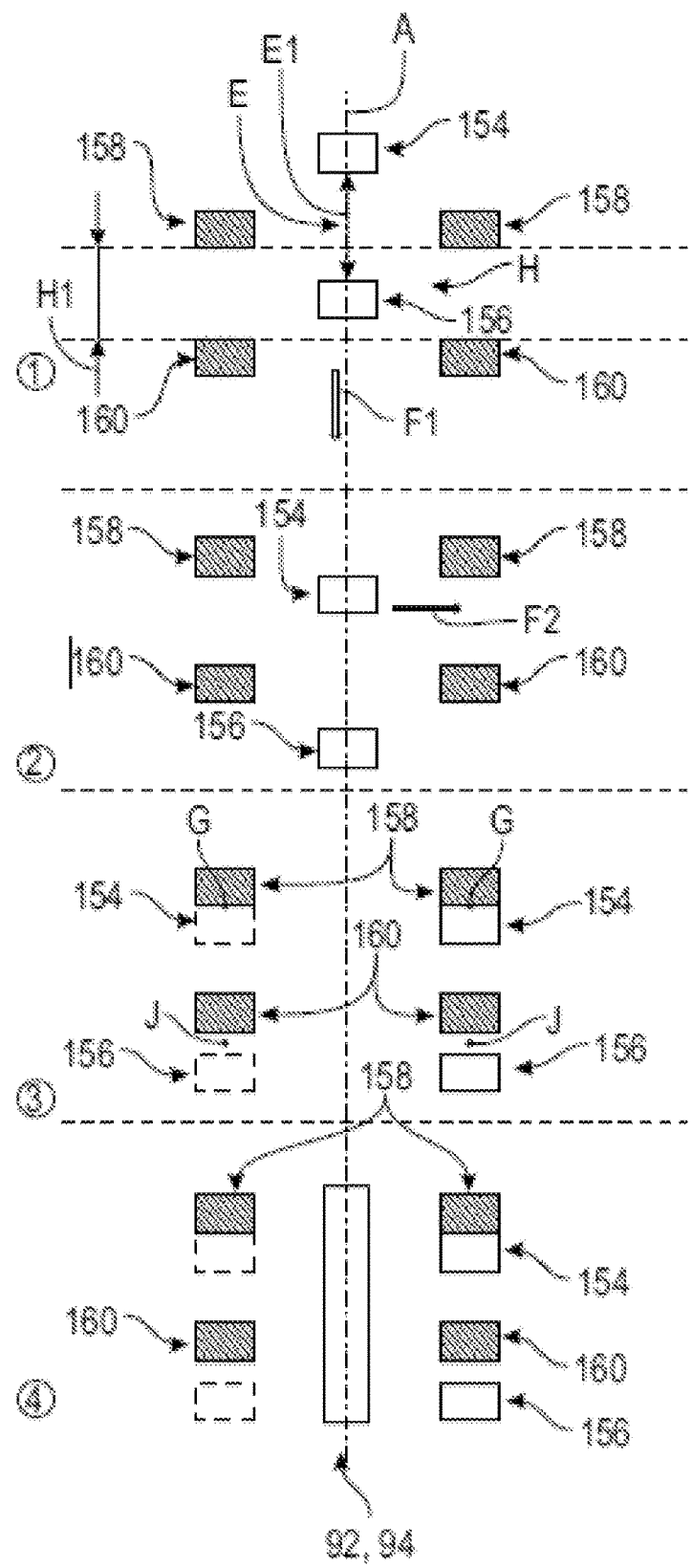
FIGS. 19a and 19b are very schematic views of mounting kinematics of a double dog clutch immobilisation ring.

FIG. 19a illustrates a first kinematic mounting for the ring 152 when the teeth of the two rows 154, 156 are axially aligned, as is the case in the example of FIG. 18.

In this case, the double dog clutch is carried out by a single translation of the ring 152 in the cup 58 and by a single rotation of the ring 152 inside the cup 58.

As schematically shown in FIG. 19a, the cup 58 also comprises two annular rows of internal teeth 158, 160. This figure shows only two teeth in each row 158, 160 and one tooth in each row 154, 156 for clarity.

The row of teeth 158 is located at an upper end of the cup 58 and is intended to cooperate by dog clutch with the row of teeth 154, and the row of teeth 160 is located just below the row 158 and is intended to cooperate by dog clutch with the row of teeth 156.

The rows of teeth 158, 160 are separated from each other by a space H which has an axial dimension H1. This dimension is measured along the axis A. This dimension H1 is greater than the thickness E2 of the teeth of the row 154 so that these teeth can be engaged between two teeth of the rows 158, 160 of the cup.

The arrow F1 illustrates the translational displacement of the ring 152 within the cup 58 along the axis A. The teeth of the two rows 154, 156 of the ring 152 are aligned with the inter-tooth spaces of the rows 158, 160. The displacement is carried out until the teeth of the row 154 are transversely aligned with the space H.

The arrow F2 illustrates the rotational displacement of the ring 152 within the cup 58 about the axis A. The displacement is carried out until the teeth of the rows 154, 156 are axially aligned with the teeth of the rows 158, 160.

As will be described in more detail below with reference to FIGS. 20 and 21, the teeth of one of the rows 154, 156 are configured to be supported axially G against the teeth of one of the rows 158, 160 to ensure the axial retention of the vane 10 in the cup 58. This is the case for the rows 154, 158 in the illustrated schematic example.

The teeth of the other of the rows 154, 156 are configured to be separated by a predetermined axial clearance J from the teeth of one of the rows 158, 160 to ensure a safety in this retention in the event of failure. This is the case for the rows 156, 160 in the illustrated schematic example.

A locking annulus 92 or skids 94 of the type described above can then be used to immobilise in rotation the ring 152 in the cup.

Figure 19B:
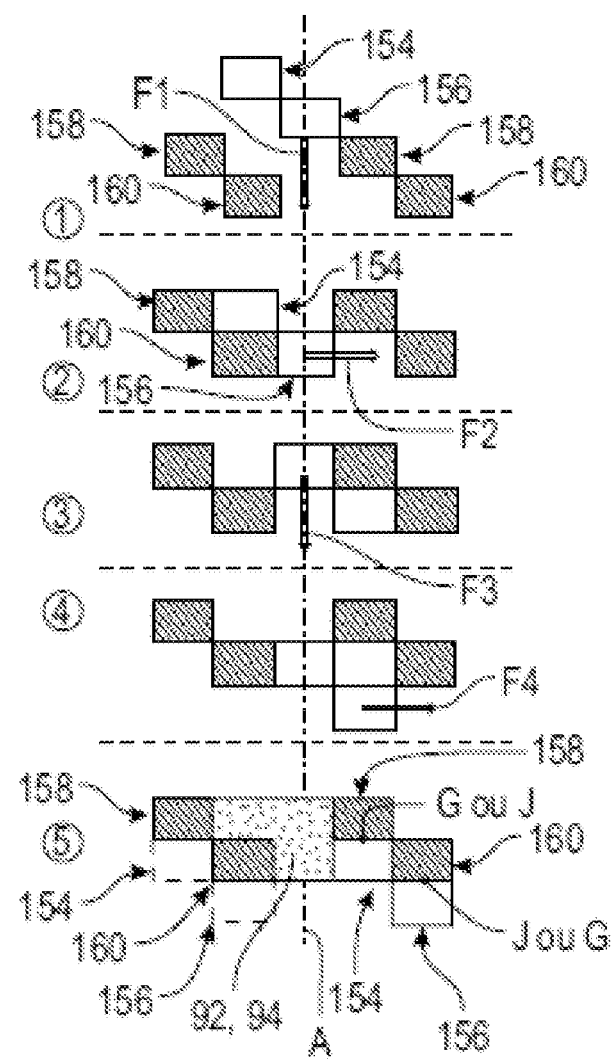

FIG. 19b illustrates a second kinematics of mounting the ring 152 when the teeth of the two rows 154, 156 are angularly offset and therefore not axially aligned. The example shows the case of an angular offset of one pitch, where this step represents the angular extent of a tooth.

In this case, the double dog clutch is carried out by two translations of the ring 152 in the cup 58 and by two rotations of the ring 152 inside the cup 58.

The arrow F1 illustrates the translational displacement of the ring 152 within the cup 58 along the axis A. The teeth of the row 156 of the ring are aligned with the inter-tooth spaces of the row 158. The displacement is carried out until the teeth of the row 156 are located under the teeth of the row 158.

The arrow F2 illustrates the rotational displacement of the ring 152 within the cup 58 about the axis A. The displacement is carried out until the teeth of the row 156 are axially aligned with the inter-tooth spaces of the row 160.

The arrow F3 illustrates the translational displacement of the ring 152 within the cup 58 along the axis A. The displacement is carried out until the teeth of the row 156 are located under the teeth of the row 160.

The arrow F4 illustrates the rotational displacement of the ring 152 within the cup 58 about the axis A. The displacement is carried out until the teeth of the row 156 are axially aligned with the teeth of the row 160 and the teeth of the row 154 are axially aligned with the teeth of the row 158.

As discussed above, the teeth of one of the rows 154, 156 are configured to be in axial support G against the teeth of one of the rows 158, 160 to ensure the axial retention of the vane in the cup. The teeth of the other of the rows 154, 156 are configured to be separated by a predetermined axial clearance J from the teeth of one of the rows 158, 160 to ensure a safety in this retention in the event of failure.

A locking annulus 92 or skids 94 of the type described above can then be used to immobilise in rotation the ring 152 in the cup.

Figure 21:
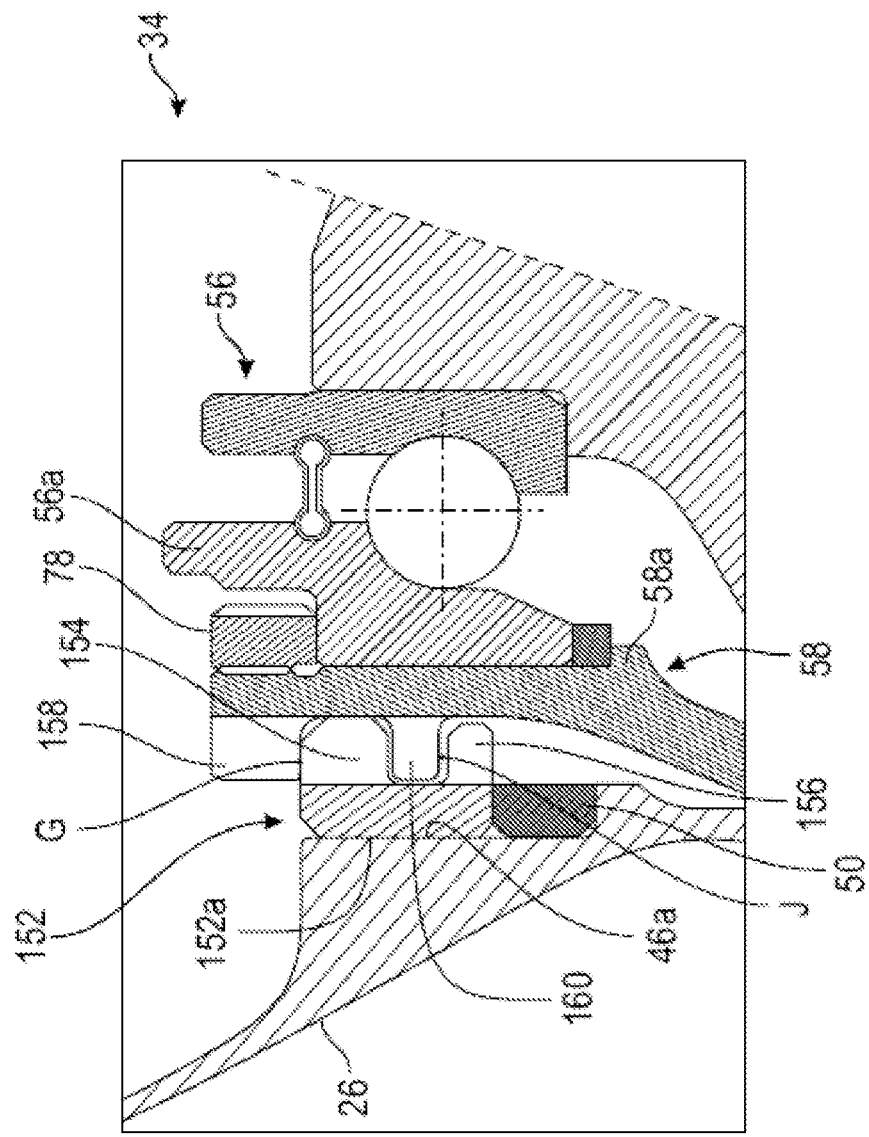
FIG. 21 is a partial schematic view in axial section of a second embodiment of a system according to the invention.
Figure 22:
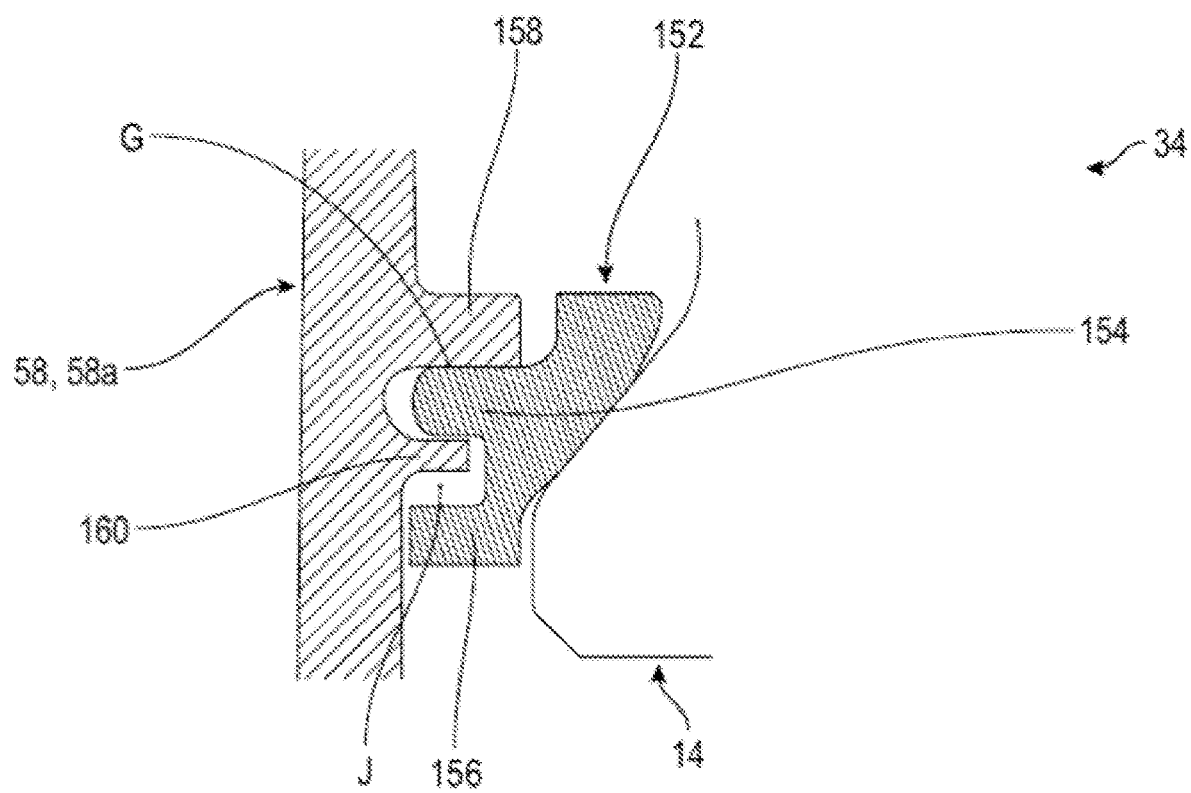
FIG. 22 is a partial schematic view in axial section of a third embodiment of a system according to the invention.

FIGS. 20 to 22 illustrate more concrete embodiments of the double dog clutch ring 152 according to the invention.

Each of these rings 152 is used in an environment similar to that described above in relation to FIG. 8 in particular. The foregoing description therefore applies to the embodiments of FIGS. 20 to 22 insofar as it does not contradict what follows.

With reference to FIG. 20, the upper axial end of the wall 58a of the cup 58 comprises at its internal periphery the two rows of teeth 158, 160. The teeth in the rows 158, 160 have substantially identical internal and external diameters. The external periphery of the upper axial end of the wall 58a comprises the external screw thread of the nut 78 which is supported on the internal ring 56a of the bearing 56.

In this embodiment, the row of active teeth is the row of teeth 156, i.e. the lower row of teeth. This row of teeth 156 is intended to cooperate by axial support G outwards with the teeth 160 of the cup 58. The row of passive teeth is the row 154, i.e. the upper row of teeth. This row of teeth 154 is separated by an axial clearance J from the row of teeth 158.

The ring 152 is supported axially inwards on the shrink-fitting ring 50 and its external cylindrical surface 152a cooperates in sliding contact with the cylindrical surface 46a during the double dog clutch of the ring. This surface 152a here extends over only one portion of the axial dimension of the ring 152. The axial dimension of the surface 152a is approximately 90% to 100% of the maximum axial dimension of the teeth of the row 156 or of the ring 152.

The embodiment shown in FIG. 20 represents a relatively simple solution in which the passive dog teeth 154 are not subjected to any particular forces and are therefore isolated, unless the active dog teeth 156 fail. However, there is a concern that, as a result of the failure of the active dog, the force path of the passive dog could also be damaged, which would reduce its effectiveness.

In FIG. 21, the row of active teeth is the row of teeth 154, i.e. the upper row of teeth. This row of teeth 154 is intended to cooperate by axial support G outwardly with the teeth 158 of the cup 58. The row of passive teeth is the row of teeth 156, i.e. the lower row of teeth. This row of teeth 156 is separated by an axial clearance J from the row of teeth 160.

The ring 152 is supported axially inwards on the shrink-fitting ring 50 and its external cylindrical surface 152a cooperates in sliding contact with the cylindrical surface 46a during the double dog clutch of the ring. This surface 152a here extends over a major portion of the axial dimension of the ring 152. The axial dimension of the surface 152a is approximately 90% to 100% of the maximum axial dimension of the ring.

The embodiment shown in FIG. 21 represents a compact solution. This solution also has the advantage of a better reliability of the passive dog, as there is less chance that the failure of the active dog will have damaged the force path of the passive dog.

In the alternative embodiment shown in FIG. 22, the ring 152 differs from that of FIGS. 20 and 21, in particular in that its internal periphery has a frustoconical inwardly flared which is complementary at least partly to the bulb of the root. The aforementioned barrel 26 can then be removed or even considered as integrated into the ring 152 (on the outer side of the bulb).

Moreover, the ring 152 may be sectored and comprise a plurality of angular sectors arranged adjacent to each other about the axis A.

Although the ring sectors 152 are independent, they may be individually mounted in the same way as a monobloc ring, by double dog clutch with one of the kinematics of FIGS. 19a and 19b.

Advantageously, the aforementioned clearance J is determined so as to generate an unbalance when the propeller equipped with the system 34 is rotated. This unbalance is generated by the radial displacement of the vane 10 after the primary dog has broken and can be detected by a suitable sensor equipped to the propeller. The detection of this unbalance can trigger the engine stop to limit the impact force during contact after the primary dog has broken.

Regardless of the embodiment, the passive dog teeth may have smaller dimensions, and in particular axial thicknesses, than that of the active dog teeth, because unlike the active dog, the passive dog is not fatigue-dimensioned and can accept a higher stress.

The invention also proposes a method for mounting the system 34, which comprises the following steps:
a) inserting the root 14 of the vane 10 into the cup 58 of the system 34, by displacing the vane 10 in a direction parallel to the pitch setting axis A,
b) engaging the free end 28 of the root 14 in the recess 60 of the bottom wall 58b of the cup 58 so as to secure in rotation the cup 58 to the root 14 of the vane 10, and
c) engaging the immobilisation ring 52, previously mounted or present around the root 14 of the vane 10, in the cup 58 and mounting this ring 52 in the cup 58 and on the root 14 of the vane 10 by dog clutch so as to ensure the axial retention of the root 14 in the cup 58. The kinematics of FIG. 19a or FIG. 19b are adopted depending on the type of double dog clutch, as mentioned above. Thus, in the step c), the ring 152 is engaged in the cup 58 and on the root 14 of the vane 10 so as to ensure the axial retention of the root 14 in the cup 58, in particular by being able to consider sectors of the ring 152. An insertion notch can be provided in the cup 58 to facilitate the mounting of the ring and where appropriate its sectors, or the geometry of the sectors can be adapted to allow the mounting without any insertion notch.

Other variant embodiments not shown are possible, including:

- the half-shells 26*a*, 26*b* of the barrel 26 can be fitted to the body 24 by bolting, riveting, welding, etc.;
- the glue for connecting the barrel 26 to the body 24 may be an epoxy glue, but it may also be an elastomer or a thermoplastic glue. It is also possible to use a non-stick film to allow for a relative movement while limiting the wear by friction;
- still on the subject of the barrel/body interface, several technical solutions can also be combined together among those proposed (gluing, pre-stress by washers or springs, pre-stress by the geometry of the barrel); these solutions can be combined independently of the existence of a clearance between the two portions of the barrel;
- Although less advantageous, the radial position of the bearing that ensures the centrifugal retention of the vane can be reversed with the radial position of the bearing that take up the bending moments resulting from the aerodynamic and centrifugal forces.

The invention claimed is:

1. A system for controlling pitch of a propeller vane for an aircraft turbine engine, the system comprising:
    a cup having an annular wall extending about a pitch setting axis of the vane, the annular wall comprising a lower axial end enclosed by a bottom wall and an upper axial end that is open and configured to allow a root of the vane configured to be mounted inside the cup, the bottom wall being configured to cooperate in a form-fitting manner with a free end of the root so that the cup is secured in rotation to the root about the pitch setting axis; and
    an immobilization ring extending about the pitch setting axis and configured to be mounted about the root, the immobilization ring being configured to be mounted within the cup and to cooperate with the root and the annular wall of the cup, respectively, to ensure axial retention of the root within the cup,
    wherein the immobilization ring is a double dog clutch ring which comprises first and second annular rows of external dog teeth, the first annular row of external dog teeth being configured to cooperate by dog clutch with complementary first internal dog teeth of the annular wall of the cup and by an axial support with the complementary first internal dog teeth to ensure axial retention of the root in the cup, and the second annular row of external dog teeth being configured to cooperate by dog clutch with complementary second internal dog teeth of the annular wall of the cup and being spaced from the complementary second internal dog teeth by an axial clearance to ensure a safety in the event of failure of the first annular row of external dog teeth.

2. The system of claim 1, wherein the first annular row of external dog teeth is an upper row of teeth intended to be located on a side of a blade of the vane, and wherein the second annular row of external dog teeth is a lower row of teeth.

3. The system of claim 1, wherein the second annular row of external dog teeth is an upper row of teeth intended to be located on a side of a blade of the vane, and wherein the first annular row of external dog teeth is a lower row of teeth.

4. The system of claim 1, wherein the first and second annular rows of external dog teeth are axially spaced from each other by a space which is intended to accommodate the complementary first or second internal dog teeth and which has an axial dimension greater than an axial thickness of the complementary first or second internal dog teeth.

5. The system of claim 1, wherein the teeth of the first annular row of external dog teeth have a greater axial thickness (E2, E3) than that of the teeth of the second annular row of external dog teeth.

6. The system of claim 1, wherein the first and second annular rows of external dog teeth have substantially a same internal diameter and a same external diameter.

7. The system of claim 1, wherein the immobilization ring comprises an internal cylindrical surface at its internal periphery, this internal cylindrical surface being configured to cooperate by sliding with an external cylindrical surface complementary of the root of the vane or of an element fitted to this root during the double dog clutch, and this internal cylindrical surface being located within the first annular row of external dog teeth or within the second annular row of external dog teeth.

8. The system of claim 7, wherein the internal cylindrical surface has an axial dimension which is between 90% and 100% of an axial thickness of the teeth of the first row of teeth or a maximum axial thickness of the immobilization ring.

9. The system of claim 1, wherein the system further comprises:
    a lower rolling guide bearing extending around the pitch setting axis and mounted around a lower portion of the annular wall; and
    an upper rolling guide bearing extending around the pitch setting axis and mounted around an upper portion of the annular wall.

10. The system of claim 9, wherein at least one of the guide bearings has its internal ring integrated with the cup.

11. The system of claim 9, wherein the upper portion of the annular wall around which the upper bearing is mounted comprises the complementary first or second internal dog teeth at its internal periphery and a thread at its external periphery, a nut being screwed onto this thread and being supported axially on an external ring of the upper bearing.

12. The system of claim 1, wherein it further comprises a locking annulus and an annular snap ring, the locking annulus being configured to be axially engaged between the internal and external dog teeth to prevent the rotation of the dog clutch ring within the cup, and the annular snap ring being mounted in the cup to axially block the locking annulus in the cup.

13. An assembly, comprising:
    a system according to claim 1; and
    a variable pitch propeller vane, the vane comprising a blade connected to a root, the root comprising a body housed in an annular barrel which extends around the pitch setting axis of the vane.

14. A method for mounting a system according to claim 1, the method comprising:
    inserting the root of the vane within the cup of the system by displacing the vane in a direction parallel to the pitch setting axis;
    engaging the free end of the root in the recess of the bottom wall of the cup so as to secure in rotation the cup to the root of the vane; and
    engaging the immobilization ring, previously mounted or present around the root of the vane, in the cup and mounting this ring by double dog clutch in the cup and on the root of the vane so as to ensure the axial retention of the root in the cup.

\* \* \* \* \*